(12) United States Patent
Kondo et al.

(10) Patent No.: US 7,495,707 B2
(45) Date of Patent: Feb. 24, 2009

(54) SIGNAL PROCESSING APPARATUS AND METHOD, RECORDING MEDIUM, AND PROGRAM

(75) Inventors: Tetsujiro Kondo, Tokyo (JP); Shizuo Chikaoka, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1229 days.

(21) Appl. No.: 10/483,095

(22) PCT Filed: Apr. 28, 2003

(86) PCT No.: PCT/JP03/05490

§ 371 (c)(1),
(2), (4) Date: Jan. 6, 2004

(87) PCT Pub. No.: WO03/096706

PCT Pub. Date: Nov. 20, 2003

(65) Prior Publication Data

US 2004/0218096 A1 Nov. 4, 2004

(30) Foreign Application Priority Data

May 8, 2002 (JP) ............................. 2002-132819

(51) Int. Cl.
*H04N 5/46* (2006.01)

(52) U.S. Cl. .................... 348/555; 348/441; 348/414.1; 348/558

(58) Field of Classification Search ................ 348/441, 348/458–459, 409.1, 410.1, 411.1, 412.1, 348/414.1, 417.1–418.1, 422.1, 555, 558; 382/232; *H04N 5/46*

See application file for complete search history.

(56) References Cited

U.S. PATENT DOCUMENTS

| | | | |
|---|---|---|---|
| 5,663,764 A * | 9/1997 | Kondo et al. | 375/240.14 |
| 5,727,085 A * | 3/1998 | Toyama et al. | 382/232 |
| 6,571,142 B1 * | 5/2003 | Kondo et al. | 700/90 |

FOREIGN PATENT DOCUMENTS

| | | |
|---|---|---|
| EP | 1 073 279 | 1/2001 |
| JP | 2000-341706 | 12/2000 |
| JP | 2001-8056 | 1/2001 |
| WO | WO 00/49812 | 8/2000 |

* cited by examiner

*Primary Examiner*—Trang U Tran
(74) *Attorney, Agent, or Firm*—Frommer Lawrence & Haug LLP; William S. Frommer; Paul Levy

(57) ABSTRACT

The present invention relates to a signal processing apparatus and method, a recording medium, and a program, in which a more preferable class can be easily selected. A region extracting unit 151 extracts a class tap from an input composite video signal, and pattern detecting units 152 to 154 detect patterns for classes by using different predetermined methods. A class-code determining unit 155 determines a class based on information from an evaluation table 156, and a coefficient memory 157 supplies a predictive coefficient corresponding to the class to a predictive computing unit 159. The predictive computing unit 159 performs predictive computing based on a predictive tap supplied from a region extracting unit 158 and the predictive coefficient supplied from the coefficient memory 157, so that a component Y signal is generated and is output therefrom. The present invention can be applied to a television receiver.

17 Claims, 14 Drawing Sheets

SIGNAL PROCESSING APPARATUS AND METHOD, RECORDING MEDIUM, AND PROGRAM

TECHNICAL FIELD

The present invention relates to a signal processing apparatus and method, a recording medium, and a program. In particular, the present invention relates to a signal processing apparatus and method, a recording medium, and a program, in which a more preferable class can be easily selected by adopting a classification method of the largest S/N ratio among a plurality of learned classification methods.

BACKGROUND ART

A television signal in the National TV Standards Committee (NTSC) system has a multiplexed form in which a luminance signal Y is balanced-modulated by a chroma signal C.

Therefore, a known television receiver receives a television signal, separates the television signal into a luminance signal Y and a chroma signal C (Y/C separation), and decodes the chroma signal, so as to generate component signals including a luminance signal Y, a color-difference signal R-Y, and a color difference signal B-Y. Further, the television receiver performs matrix conversion so as to generate RGB signals, and supplies the RGB signals to a display device such as a cathode ray tube (CRT). Accordingly, color video images can be displayed.

FIG. 1 shows an example of the configuration of a main part of a known television receiver.

In FIG. 1, a tuner 12 of the television receiver 1 receives a video carrier signal of a predetermined channel through an antenna 11, generates a video intermediate frequency signal based on the video carrier signal, and supplies the video intermediate frequency signal to a video intermediate frequency (VIF) circuit 13. The VIF circuit 13 decodes the supplied video intermediate frequency signal so as to generate a composite video signal, which is supplied to a Y/C separator 14.

The Y/C separator 14 separates the supplied composite video signal into a luminance signal (Y) and a chroma signal (C). Then, the Y/C separator 14 supplies the chroma signal (C) to a chroma decoder 15. The chroma decoder 15 decodes the chroma signal (C) so as to supply color-difference signals: an R-Y signal (R-Y) and a B-Y signal (B-Y), to a matrix circuit 16.

Also, the Y/C separator 14 supplies the luminance signal (Y) to the matrix circuit 16. The matrix circuit 16 generates an R signal (R), a G signal (G), and a B signal (B) based on the luminance signal (Y) supplied from the Y/C separator 14 and the R-Y signal and the B-Y signal supplied from the chroma decoder 15, and supplies the RGB signals to a CRT 17. The CRT 17 displays color video images based on the supplied R signal (R), G signal (G), and B signal (B).

In the above-described example, however, the composite video signal is separated into the luminance signal (Y) and the chroma signal (C), which is decoded so as to generate the R-Y signal and B-Y signal, and then the RGB signals are generated. In this method, the number of processes and the scale of the processing circuit become large, which is disadvantageous.

Also, when a two-dimensional or three-dimensional Y/C separator is used as the Y/C separator 14 so as to perform filter processing, image quality is often degraded, for example, dot interference or cross-color occurs at the edge of an image or in a motion picture, due to a Y/C separation error.

On the other hand, a component video signal can be directly generated from a composite video signal by using classification adaptive processing.

In this method, in order to obtain component signals, such as Y signal, R-Y signal, and B-Y signal, in a target pixel of an image corresponding to a video signal, classification is performed by using feature obtained from a composite signal of the target pixel and a pixel which is temporally or spatially approximate to the target pixel (class tap).

Then, by performing computation of a fixed coefficient prepared for each class and a predictive tap obtained from the composite signal along with the class tap, a component signal in the target pixel can be directly obtained from the composite signal.

In this case, however, when the fixed coefficient prepared for each class is not appropriate for the target pixel, degradation of image quality, such as dot interference and cross-color, cannot be adequately improved.

In order to solve this problem, a plurality of classification methods can be used and the results thereof can be combined, so as to precisely classify the feature of a composite signal and to perform adequate classification. In this case, however, the number of classes becomes numerous and thus the processing circuit for realizing this method becomes large, which is not practical.

DISCLOSURE OF INVENTION

The present invention has been made in view of the above-described situation, and it is an object of the present invention to provide a method for easily selecting a more preferable class.

A first signal processing apparatus of the present invention includes: first extracting means for extracting a first part used for classification from an input signal to which a plurality of types of signals are multiplexed; detecting/classifying means for detecting patterns by using a plurality of methods based on the first part extracted by the first extracting means so as to classify the patterns into classes; first storage means for storing an S/N-ratio value of each of the classes set by the detecting/classifying means; class determining means for determining a class to be adopted from the classes set by the first detecting/classifying means based on the S/N-ratio values stored in the first storage means; second storage means for storing a plurality of predictive coefficients; predictive-coefficient determining means for determining a predictive coefficient corresponding to the class determined by the class determining means from the predictive coefficients stored in the second storage means; second extracting means for extracting a second part used for prediction from the input signal; and signal generating means for computing and generating a predetermined signal based on the second part extracted by the second extracting means and the predictive coefficient determined by the predictive-coefficient determining means.

The first storage means may store the S/N-ratio values, which correspond to each of the methods used by the detecting/classifying means.

The first storage means may store the S/N-ratio values, each value corresponding to one of the classes set by the detecting/classifying means.

The second storage means may store the predictive coefficients, which correspond to each of the methods used by the detecting/classifying means.

The second storage means may store the predictive coefficients, each coefficient corresponding to one of the classes set by the detecting/classifying means.

The first storage means may store S/N-ratio values supplied from another signal processing apparatus.

The second storage means may store predictive coefficients supplied from another signal processing apparatus.

A first signal processing method of the present invention includes: a first extracting step of extracting a first part used for classification from an input signal to which a plurality of types of signals are multiplexed; a detecting/classifying step of detecting patterns by using a plurality of methods based on the first part extracted in the first extracting step so as to classify the patterns into classes; a first storage control step of controlling storage of an S/N-ratio value of each of the classes set in the detecting/classifying step; a class determining step of determining a class to be adopted from the classes set in the first detecting/classifying step based on the S/N-ratio values, the storage thereof being controlled in the first storage control step; a second storage control step of controlling storage of a plurality of predictive coefficients; a predictive-coefficient determining step of determining a predictive coefficient corresponding to the class determined in the class determining step from the predictive coefficients, the storage thereof being controlled in the second storage control step; a second extracting step of extracting a second part used for prediction from the input signal; and a signal generating step of computing and generating a predetermined signal based on the second part extracted in the second extracting step and the predictive coefficient determined in the predictive-coefficient determining step.

A program stored in a first recording medium of the present invention includes: a first extracting step of extracting a first part used for classification from an input signal to which a plurality of types of signals are multiplexed; a detecting/classifying step of detecting patterns by using a plurality of methods based on the first part extracted in the first extracting step so as to classify the patterns into classes; a first storage control step of controlling storage of an S/N-ratio value of each of the classes set in the detecting/classifying step; a class determining step of determining a class to be adopted from the classes set in the first detecting/classifying step based on the S/N-ratio values, the storage thereof being controlled in the first storage control step; a second storage control step of controlling storage of a plurality of predictive coefficients; a predictive-coefficient determining step of determining a predictive coefficient corresponding to the class determined in the class determining step from the predictive coefficients, the storage thereof being controlled in the second storage control step; a second extracting step of extracting a second part used for prediction from the input signal; and a signal generating step of computing and generating a predetermined signal based on the second part extracted in the second extracting step and the predictive coefficient determined in the predictive-coefficient determining step.

A first program of the present invention allows a computer to execute the following steps: a first extracting step of extracting a first part used for classification from an input signal to which a plurality of types of signals are multiplexed; a detecting/classifying step of detecting patterns by using a plurality of methods based on the first part extracted in the first extracting step so as to classify the patterns into classes; a first storage control step of controlling storage of an S/N-ratio value of each of the classes set in the detecting/classifying step; a class determining step of determining a class to be adopted from the classes set in the first detecting/classifying step based on the S/N-ratio values, the storage thereof being controlled in the first storage control step; a second storage control step of controlling storage of a plurality of predictive coefficients; a predictive-coefficient determining step of determining a predictive coefficient corresponding to the class determined in the class determining step from the predictive coefficients, the storage thereof being controlled in the second storage control step; a second extracting step of extracting a second part used for prediction from the input signal; and a signal generating step of computing and generating a predetermined signal based on the second part extracted in the second extracting step and the predictive coefficient determined in the predictive-coefficient determining step.

A second signal processing apparatus of the present invention includes: multiplexing means for multiplexing a plurality of signals, each signal including one type of signal; first extracting means for extracting a first part used for classification from a signal generated by multiplexing the plurality of signals by using the multiplexing means; detecting/classifying means for detecting patterns by using predetermined methods based on the first part extracted by the first extracting means so as to classify the patterns into classes; first storage means for storing a plurality of predictive coefficients; predictive-coefficient determining means for determining a predictive coefficient corresponding to the class set by the detecting/classifying means from the predictive coefficients stored in the first storage means; second extracting means for extracting a second part used for prediction from the multiplexed signal; signal generating means for computing and generating a predetermined signal based on the second part extracted by the second extracting means and the predictive coefficient determined by the predictive-coefficient determining means; S/N-ratio calculating means for calculating S/N-ratio values used for generating the predetermined signal by the signal generating means; and second storage means for storing the S/N-ratio values calculated by the S/N-ratio calculating means.

The first storage means may store the predictive coefficients, which correspond to each of the methods used by the detecting/classifying means.

The first storage means may store the predictive coefficients, each coefficient corresponding to one of the classes set by the detecting/classifying means.

The second storage means may store the S/N-ratio values, which correspond to each of the methods used by the detecting/classifying means.

The second storage means may store the S/N-ratio values, each value corresponding to one of the classes set by the detecting/classifying means.

The second signal processing apparatus may further include supplying means for supplying the S/N-ratio values stored in the second storage means to another signal processing apparatus.

A second signal processing method of the present invention includes: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a first storage control step of controlling storage of a plurality of predictive coefficients; a predictive-coefficient determining step of determining a predictive coefficient corresponding to the class set in the detecting/classifying step from the predictive coefficients, the storage thereof being controlled in the first storage control step; a second extracting step of extracting a second part used for prediction from the multiplexed signal; a signal generating step of computing and generating a predetermined signal based on the second part extracted in the second extracting step and the predictive coefficient determined in the predictive-coefficient determining step; an S/N-ratio calculating step of calculating S/N-ratio values used for generating the predetermined signal in the signal generating step; and a second storage control step of controlling storage of the S/N-ratio values calculated in the S/N-ratio calculating step.

A program stored in a second recording medium of the present invention includes: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a first storage control step of controlling storage of a plurality of predictive coefficients; a predictive-coefficient determining step of determining a predictive coefficient corresponding to the class set in the detecting/classifying step from the predictive coefficients, the storage thereof being controlled in the first storage control step; a second extracting step of extracting a second part used for prediction from the multiplexed signal; a signal generating step of computing and generating a predetermined signal based on the second part extracted in the second extracting step and the predictive coefficient determined in the predictive-coefficient determining step; an S/N-ratio calculating step of calculating S/N-ratio values used for generating the predetermined signal in the signal generating step; and a second storage control step of controlling storage of the S/N-ratio values calculated in the S/N-ratio calculating step.

A second program of the present invention allows a computer to execute the following steps: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a first storage control step of controlling storage of a plurality of predictive coefficients; a predictive-coefficient determining step of determining a predictive coefficient corresponding to the class set in the detecting/classifying step from the predictive coefficients, the storage thereof being controlled in the first storage control step; a second extracting step of extracting a second part used for prediction from the multiplexed signal; a signal generating step of computing and generating a predetermined signal based on the second part extracted in the second extracting step and the predictive coefficient determined in the predictive-coefficient determining step; an S/N-ratio calculating step of calculating S/N-ratio values used for generating the predetermined signal in the signal generating step; and a second storage control step of controlling storage of the S/N-ratio values calculated in the S/N-ratio calculating step.

A third signal processing apparatus of the present invention includes: multiplexing means for multiplexing a plurality of signals, each signal including one type of signal; first extracting means for extracting a first part used for classification from a signal generated by multiplexing the plurality of signals by using the multiplexing means; detecting/classifying means for detecting patterns by using predetermined methods based on the first part extracted by the first extracting means so as to classify the patterns into classes; second extracting means for extracting a second part used for prediction from the multiplexed signal; normal-equation generating means for generating a normal equation for each of the classes set by the detecting/classifying means based on the second part extracted by the second extracting means and a predetermined signal including one type of signal; predictive-coefficient calculating means for calculating predictive coefficients by computing the normal equations generated by the normal-equation generating means; and storage means for storing the predictive coefficients calculated by the predictive-coefficient calculating means.

The storage means may store the predictive coefficients, which correspond to each of the methods used by the detecting/classifying means.

The storage means may store the predictive coefficients, each coefficient corresponding to one of the classes set by the detecting/classifying means.

The third signal processing apparatus may further include supplying means for supplying the predictive coefficients stored in the storage means to another signal processing apparatus.

A third signal processing method of the present invention includes: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a second extracting step of extracting a second part used for prediction from the multiplexed signal; a normal-equation generating step of generating a normal equation for each of the classes set in the detecting/classifying step based on the second part extracted in the second extracting step and a predetermined signal including one type of signal; a predictive-coefficient calculating step of calculating predictive coefficients by computing the normal equations generated in the normal-equation generating step; and a storage control step of controlling storage of the predictive coefficients calculated in the predictive-coefficient calculating step.

A program stored in a third recording medium of the present invention includes: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a second extracting step of extracting a second part used for prediction from the multiplexed signal; a normal-equation generating step of generating a normal equation for each of the classes set in the detecting/classifying step based on the second part extracted in the second extracting step and a predetermined signal including one type of signal; a predictive-coefficient calculating step of calculating predictive coefficients by computing the normal equations generated in the normal-equation generating step; and a storage control step of controlling storage of the predictive coefficients calculated in the predictive-coefficient calculating step.

A third program of the present invention allows a computer to execute the following steps: a multiplexing step of multiplexing a plurality of signals, each signal including one type of signal; a first extracting step of extracting a first part used for classification from a signal generated by multiplexing the plurality of signals in the multiplexing step; a detecting/classifying step of detecting patterns by using predetermined methods based on the first part extracted in the first extracting step so as to classify the patterns into classes; a second extracting step of extracting a second part used for prediction from the multiplexed signal; a normal-equation generating step of generating a normal equation for each of the classes set in the detecting/classifying step based on the second part extracted in the second extracting step and a predetermined signal including one type of signal; a predictive-coefficient calculating step of calculating predictive coefficients by computing the normal equations generated in the normal-equation generating step; and a storage control step of controlling storage of the predictive coefficients calculated in the predictive-coefficient calculating step.

In the first signal processing apparatus and method, the first recording medium, and the first program of the present invention, a first part used for classification is extracted from an input signal to which a plurality of types of signals are multiplexed, patterns are detected based on the extracted first part by using a plurality of methods so that the patterns are classified into classes, a class to be adopted is determined from the classes based on S/N ratio values, a predictive coefficient corresponding to the class is determined from predictive coefficients, a second part used for prediction is extracted from the input signal, and a predetermined signal is computed and generated based on the extracted second part and the determined predictive coefficient.

In the second signal processing apparatus and method, the second recording medium, and the second program of the present invention, a plurality of signals, each signal including one type of signal, are multiplexed, a first part used for classification is extracted from the multiplexed signal, patterns are detected based on the first part by using predetermined methods so that the patterns are classified into classes, a predictive coefficient corresponding to the class is determined from predictive coefficients, a second part used for prediction is extracted from the multiplexed signal, a predetermined signal is computed and generated based on the extracted second part and the predictive coefficient, the S/N ratio thereof is calculated, and the S/N ratio is stored.

In the third signal processing apparatus and method, the third recording medium, and the third program of the present invention, a plurality of signals are multiplexed, a first part used for classification is extracted from the multiplexed signal, patterns are detected based on the first part so that the patterns are classified into classes, a second part is extracted from the multiplexed signal, a normal equation for each of the classes is generated based on the extracted second part and a predetermined signal, and the generated normal equations are computed so as to calculate predictive coefficients, which are stored.

BEST MODE FOR CARRYING OUT THE INVENTION

Figure 2:
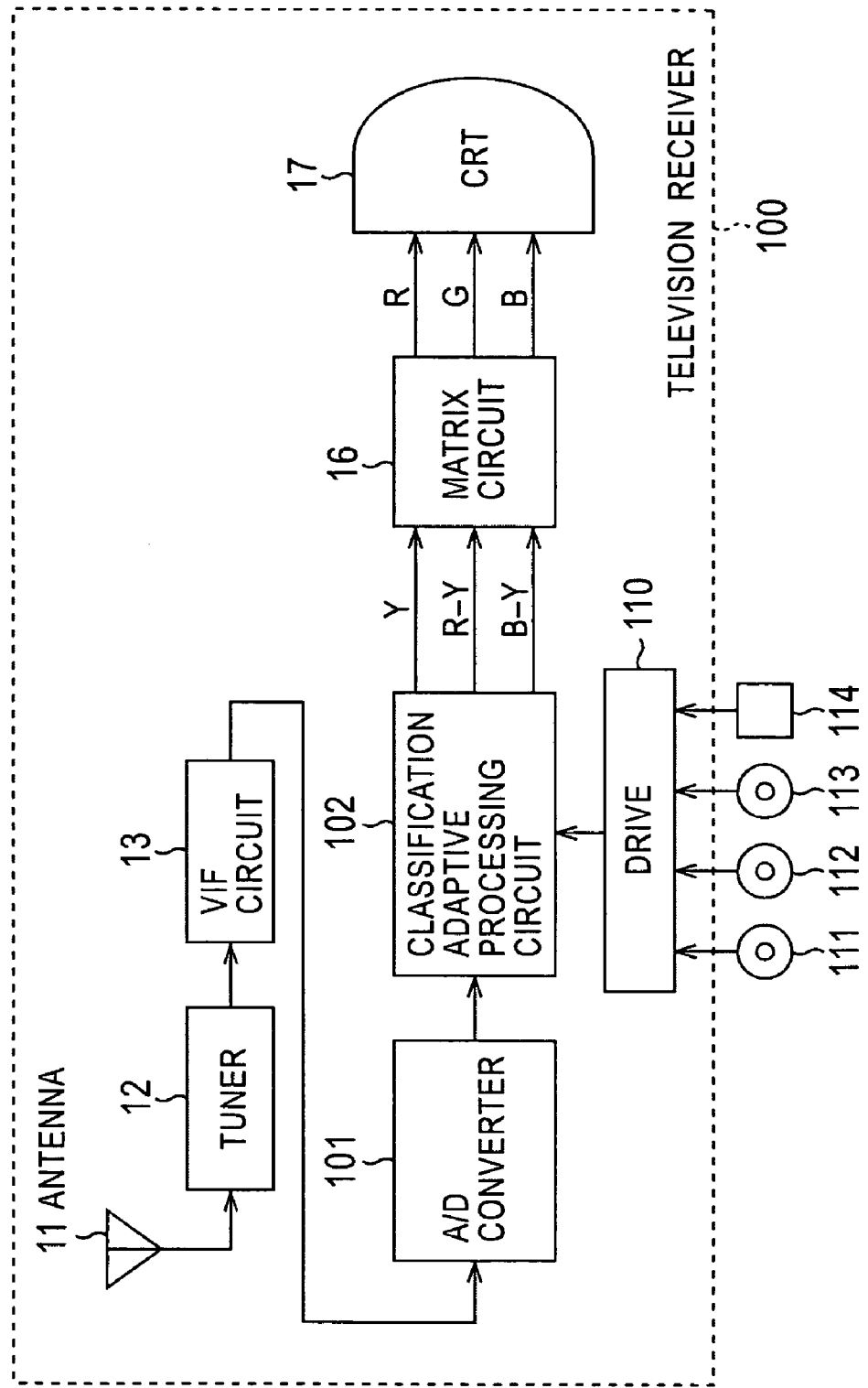
FIG. 2 is a block diagram showing an example of the configuration of a main part of a television receiver according to the present invention.

FIG. 2 is a block diagram showing an example of a basic configuration of a television receiver according to the present invention.

In FIG. 2, an antenna 11 of a television receiver 100 obtains a television signal, which is a radio signal supplied from a broadcast station (not shown), and supplies the television signal to a tuner 12. The tuner 12 selects a video carrier signal of a predetermined channel from among a plurality of channels multiplexed into the television signal, which has been obtained through the antenna 12, generates a corresponding video intermediate frequency signal, and supplies the generated signal to a video intermediate frequency (VIF) circuit 13.

The VIF circuit 13 decodes the video intermediate frequency signal of the predetermined channel supplied from the tuner 12 so as to supply a composite video signal to an A/D converter 101. The A/D converter 101 converts the obtained analog composite video signal to a digital signal, and supplies the digital signal to a classification adaptive processing circuit 102.

The classification adaptive processing circuit 102 separates the obtained composite video signal into a Y signal (Y), which is a luminance signal, and an R-Y signal (R-Y) and a B-Y signal (B-Y), which are color-difference signals, and then supplies these signals to a matrix circuit 16.

The matrix circuit 16 generates three primary-color signals: R signal, G signal, and B signal, based on the obtained Y signal, R-Y signal, and B-Y signal, and supplies those RGB signals to a cathode ray tube (CRT) 17. The CRT 17 displays video corresponding to the obtained RGB signals.

Further, a drive 110 is connected to the classification adaptive processing circuit 102 as required, and a magnetic disk 111, an optical disk 112, a magneto-optical disk 113, or a semiconductor memory 114 is loaded into the drive 110 as required. A computer program read from such a recording medium is installed into a storage unit (not shown) included in the classification adaptive processing circuit 102 as required.

Figure 1:
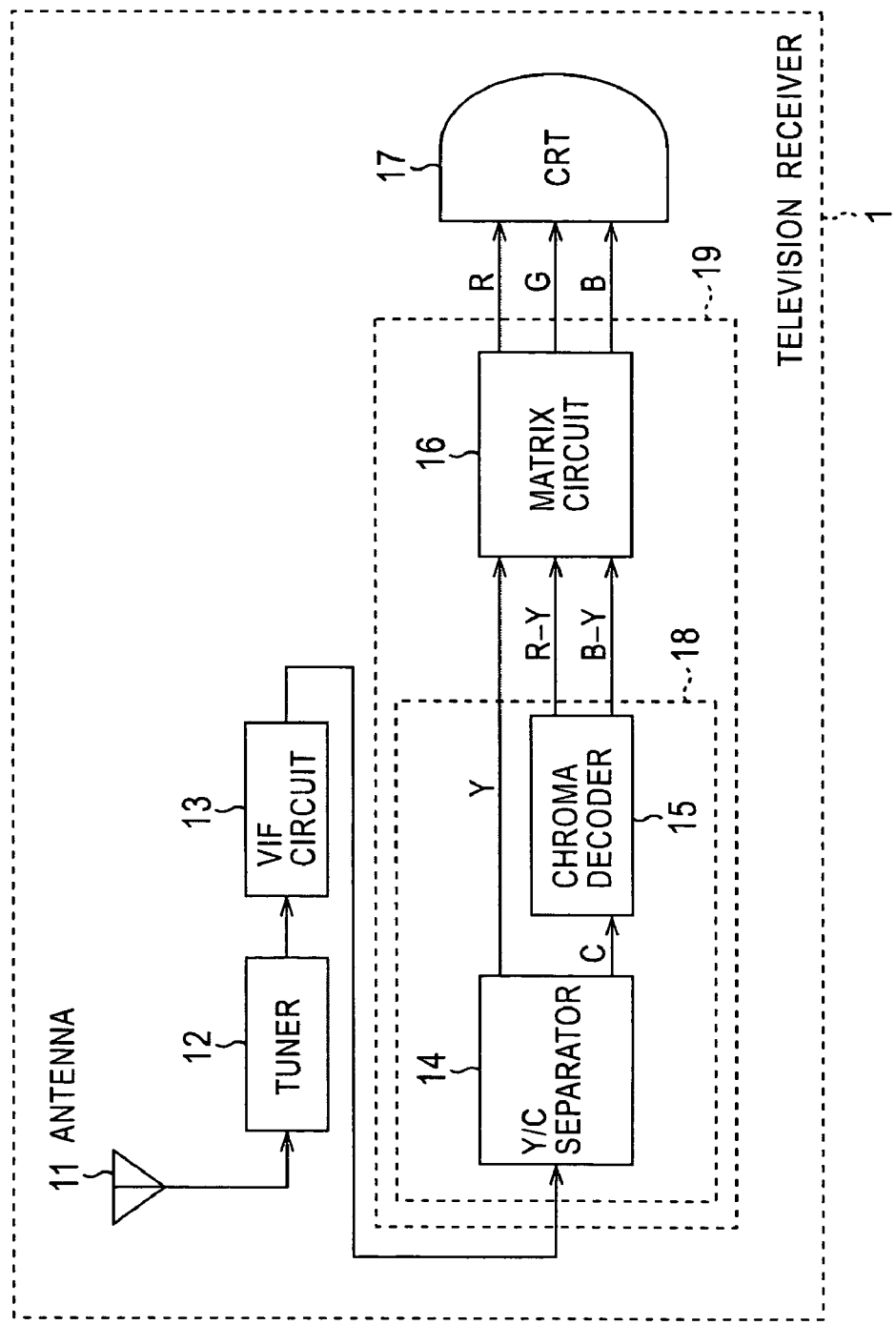
FIG. 1 is a block diagram showing an example of the configuration of a main part of a known television receiver.

In the television receiver 100 shown in FIG. 2, the function of the signal processing unit 18 including the Y/C separator 14 and the chroma decoder 15 of the television receiver 1 shown in FIG. 1 is realized by using the A/D converter 101 and the classification adaptive processing circuit 102. The configuration of the other part of the television receiver 100 is the same as that shown in FIG. 1.

Next, the operation of the television receiver 100 shown in FIG. 2 will be described.

The tuner 12 of the television receiver 100 obtains a video carrier signal of television broadcast through the antenna 11, and converts the signal to an intermediate frequency signal of a predetermined channel. Then, the intermediate frequency signal is decoded by the VIF circuit 13, so that a composite video signal of a target channel is extracted. The composite video signal is converted to a digital signal by the A/D converter 101 and is then supplied to the classification adaptive processing circuit 102.

Herein, a television signal of the NTSC system has a multiplexed form in which a luminance signal (Y) is balanced-modulated by a chroma signal (C). Thus, in a sampled composite signal, the phase of the chroma signal is different depending on the sampling point.

Figure 3:
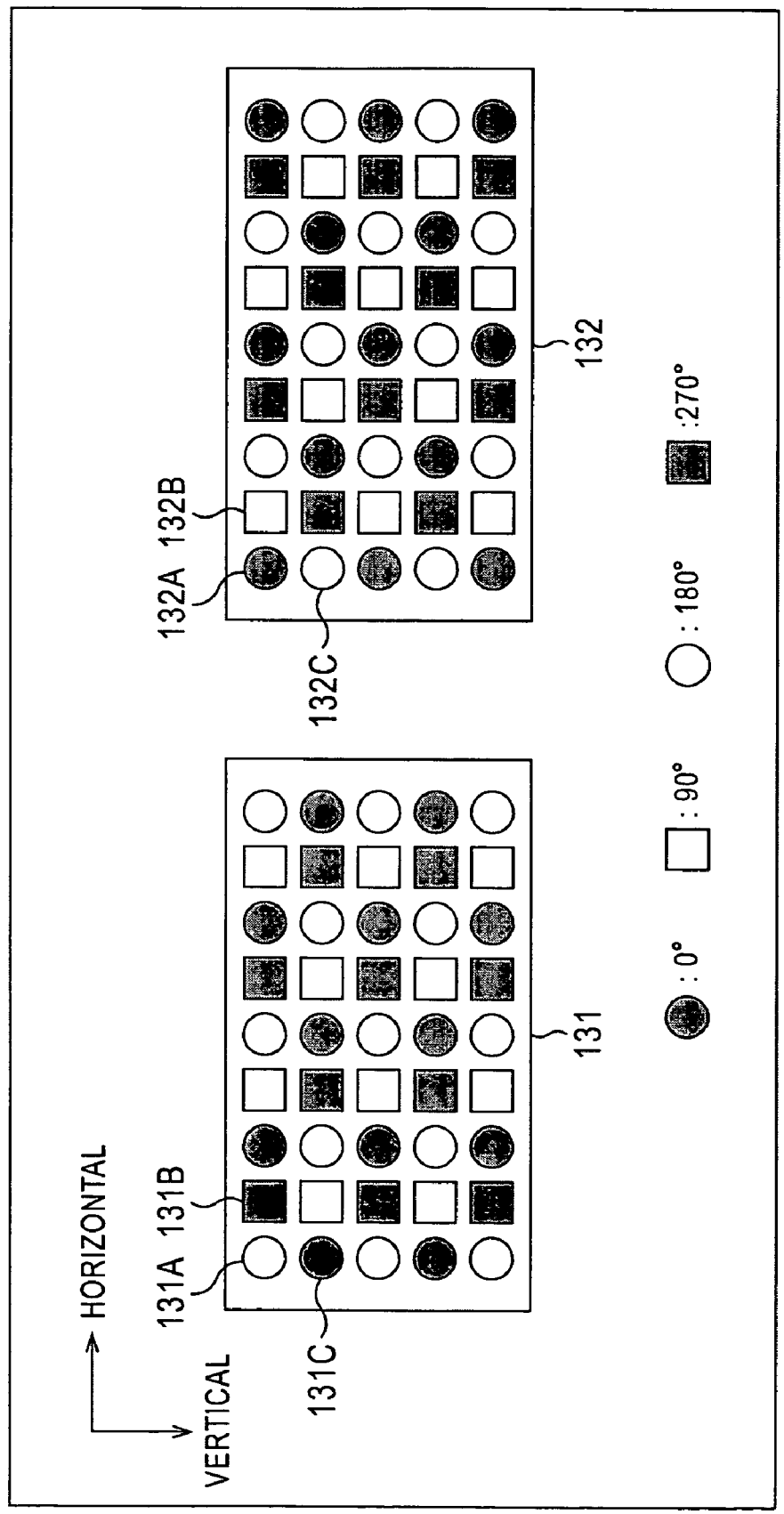
FIG. 3 shows an example of phase relationship between fields and between pixels of a chroma signal.

When the A/D converter 101 samples the NTSC signal at a sampling frequency four times a color subcarrier frequency fsc (4fsc), phase relationship between fields and between pixels in the chroma signal shown in FIG. 3 can be obtained.

In FIG. 3, phase difference between pixels which are adjacent in the horizontal direction in a field is 90°, as shown by pixels 131A and 131B in a field 131. Also, phase difference between pixels which are adjacent in the vertical direction in a field is 180°, as shown by pixels 131A and 131C in the field 131.

Further, phase difference between the pixel 131A in the field 131 and a pixel 132A in a field 132, which is the second field from the field 131, is 180°.

The classification adaptive processing circuit 102 obtains a multiplexed composite signal in which the chroma signal shown in FIG. 3 is balanced-modulated, and then performs classification by obtaining predetermined feature from a class tap, which include a target pixel and a pixel which is temporally or spatially approximate to the target pixel of corresponding video image.

Then, the classification adaptive processing circuit 102 performs computing by using a fixed coefficient prepared for each class and a predictive tap obtained along with the class tap, so as to directly convert the composite signal to Y signal, R-Y signal, and B-Y signal in the target pixel, and supplies these signals to the matrix circuit 16.

Figure 4:
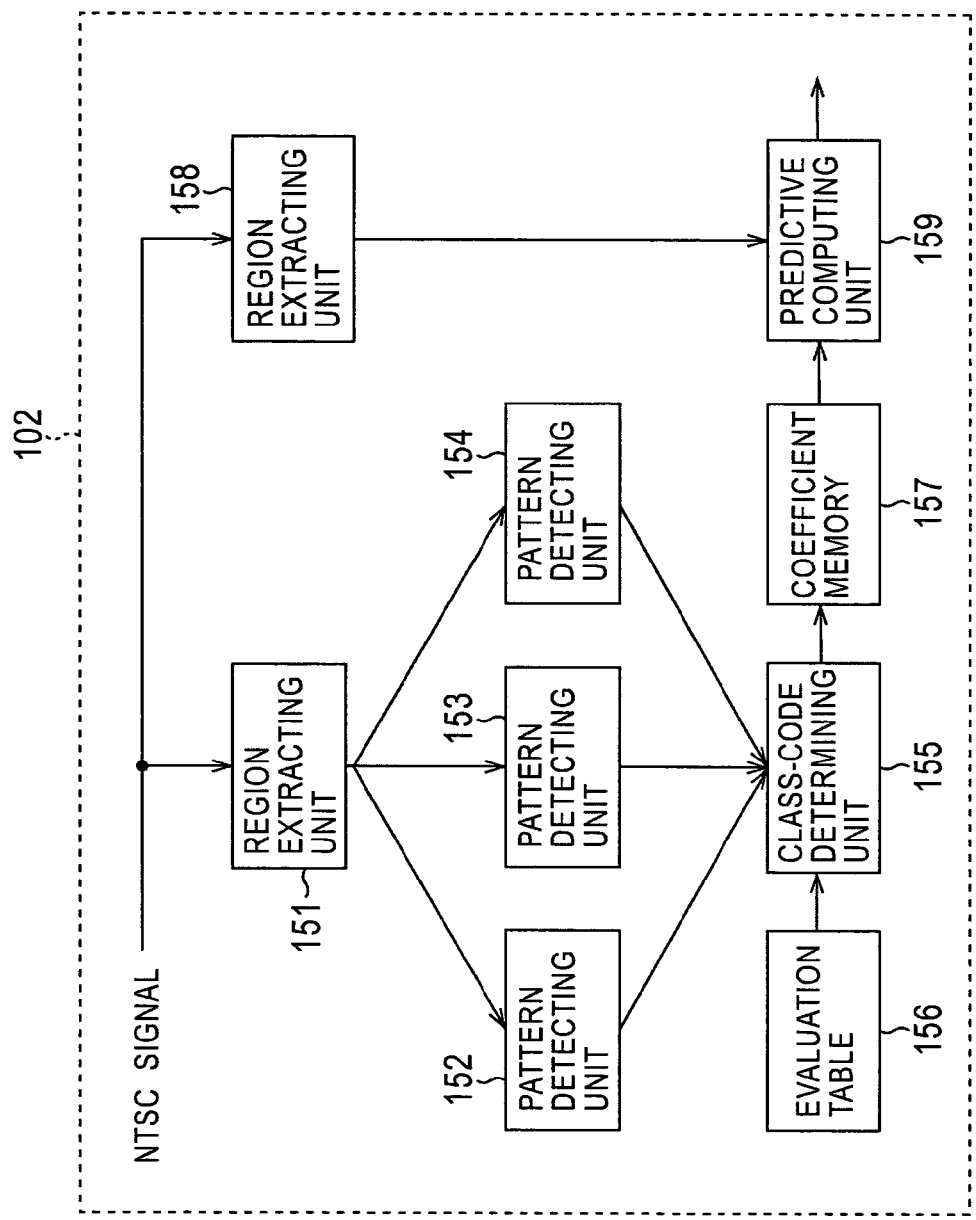
FIG. 4 is a block diagram showing an example the internal configuration of a classification adaptive processing circuit shown in FIG. 2.

Next, the classification adaptive processing circuit 102 will be described. FIG. 4 shows the internal configuration of the classification adaptive processing circuit 102.

In FIG. 4, a region extracting unit 151 of the classification adaptive processing circuit 102 extracts a pixel (class tap) which is required for performing classification from the NTSC signal, which is a composite signal supplied from the A/D converter 101 through an input terminal (not shown), and then supplies the class tap to pattern detecting units 152 to 154.

The pattern detecting unit 152 detects the pattern of the composite video signal by using a predetermined method based on the input class tap, and outputs the result to a class-code determining unit 155.

Each of the pattern detecting units 153 and 154 also detects the pattern of the composite video signal by using a predetermined method based on the input class tap, and outputs the result to the class-code determining unit 155.

The pattern detecting units 152 to 154 detect patterns by using different methods.

The number of pattern detecting units for detecting the pattern of the composite video signal is not specified, but should be two or more. In that case, the plurality of pattern detecting units detect patterns by using different methods.

In FIG. 4, the pattern detecting units are placed in parallel. Alternatively, some or all of the pattern detecting units may be placed in series.

The class-code determining unit 155 selects a pattern detecting unit to be used from among the pattern detecting units 152 to 154 based on the patterns supplied from the pattern detecting units 152 to 154 and evaluation tables supplied from an evaluation table 156, and then supplies a class code corresponding to the class for the pattern supplied from the selected pattern detecting unit to a coefficient memory 157.

A predictive coefficient of each class, which has been obtained by "learning" described later, is stored in the coefficient memory 157 in advance. The coefficient memory 157 outputs a predictive coefficient corresponding to the obtained class code to a predictive computing unit 159.

On the other hand, a region extracting unit 158 extracts a pixel (predictive tap) which is required for predictively generating a component signal from the NTSC signal, which is the composite signal supplied from the A/D converter 101 through the input terminal (not shown), and then supplies the predictive tap to the predictive computing unit 159.

The predictive computing unit 159 performs predictive computing by using the predictive coefficient supplied from the coefficient memory 157 and the predictive tap supplied from the region extracting unit 158 so as to generate a component signal. Then, the predictive computing unit 159 supplies the component signal to the matrix circuit 16 through an output terminal (not shown).

Next, the operation will be described.

The composite video signal is input through an input terminal (not shown) to the region extracting unit 151, where a class tap is extracted therefrom. The extracted class tap is supplied to the pattern detecting units 152 to 154, which detect the pattern of the composite video signal by using different predetermined methods. The detection results are supplied to the class-code determining unit 155, which determines a class based on information from the evaluation table 156 and supplies a class code corresponding to the class to the coefficient memory 157.

In the coefficient memory 157, the class code is converted to a predictive coefficient corresponding to a component Y signal, and the predictive coefficient is supplied to the predictive computing unit 159.

On the other hand, the composite video signal is input through the input terminal (not shown) to the region extracting unit 158, where a predictive tap is extracted therefrom. The extracted predictive tap is supplied to the predictive computing unit 159.

The predictive computing unit 159 performs predictive computing based on the predictive tap supplied from the region extracting unit 158 and the predictive coefficient supplied from the coefficient memory 157, so that a component Y signal is generated and is output.

Likewise, other component signals, such as an R-Y signal and a B-Y signal, can be obtained by using the same method as that of obtaining the Y signal, by allowing the coefficient memory to store predictive coefficients corresponding to those signals in advance.

In this way, the classification adaptive processing circuit 102 converts the supplied composite video signal to a component signal.

Figure 5:
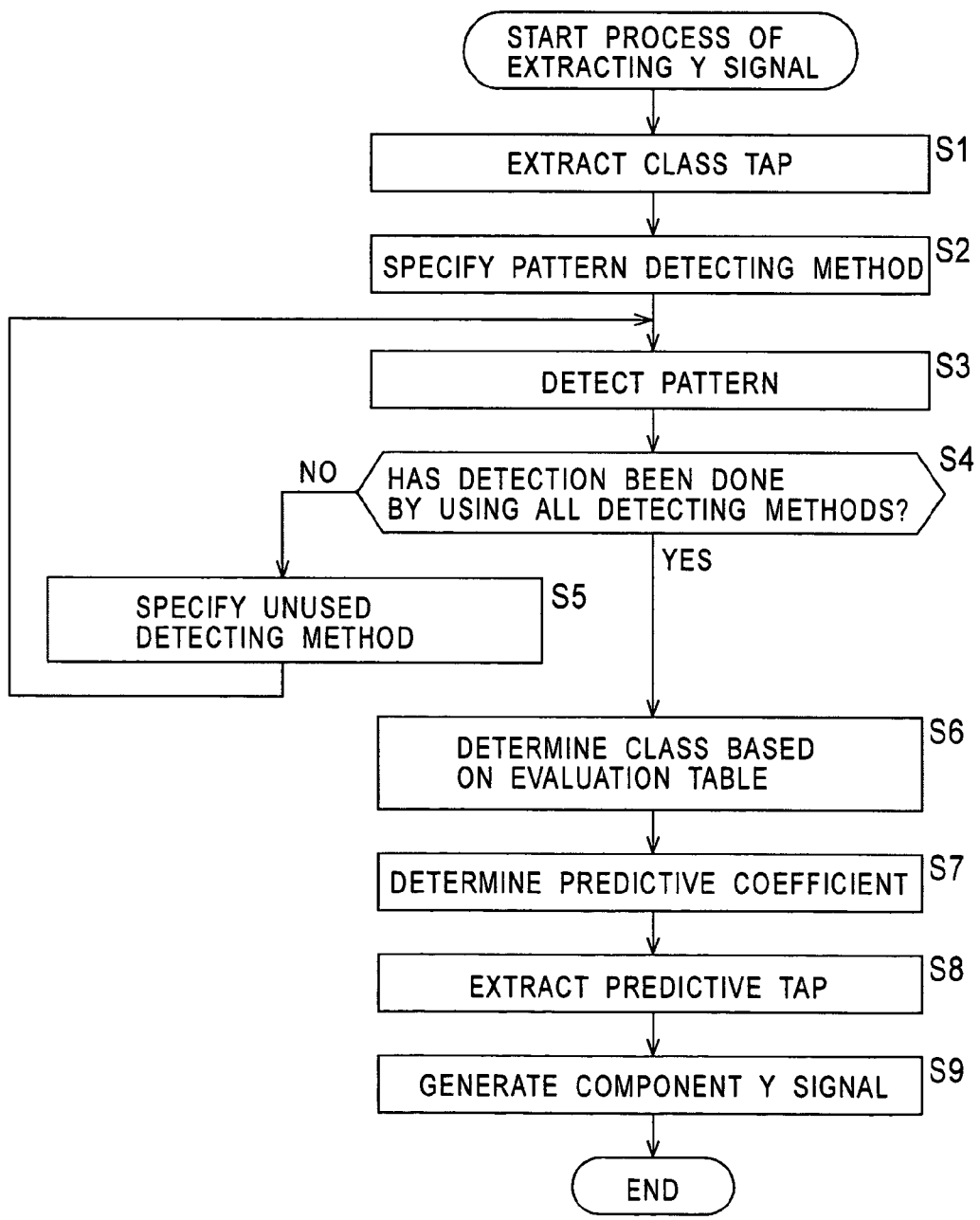
FIG. 5 is a flowchart illustrating a process of extracting Y signal, performed by the classification adaptive processing circuit shown in FIG. 2.

Next, a process of extracting a Y signal performed by the classification adaptive processing circuit 102 will be described with reference to the flowchart shown in FIG. 5.

First, in step S1, the region extracting unit 151 of the classification adaptive processing circuit 102 extracts a class tap from the supplied composite video signal. Then, in step S2, the classification adaptive processing circuit 102 selects a method to be used from among a plurality of prepared pattern detecting methods.

Then, the process proceeds to step S3, where the classification adaptive processing circuit 102 detects a pattern by using the method specified in step S2, and determines whether or not detection has been done by using all the detecting methods in step S4. When it is determined that an unused method exists and that all the detecting methods have not been used, the classification adaptive processing circuit 102 selects a method to be used from among the unused method(s) in step S5. Then, the process returns to step S3 so that the following steps are repeated.

That is, the classification adaptive processing circuit 102 repeats steps S3 to S5 so as to detect patterns from a class tap by using all the prepared detecting methods. In the example shown in FIG. 4, patterns are detected by all the pattern detecting units 152 to 154.

Then, in step S4, when it is determined that patterns have been detected by using all the detecting methods, the process proceeds to step S6, where the class-code determining unit 155 of the classification adaptive processing circuit 102 determines a class and a corresponding class code based on the prepared information stored in the evaluation table 156.

Then, the process proceeds to step S7, where the coefficient memory 157 in the classification adaptive processing circuit 102 determines a predictive coefficient corresponding to a component Y signal based on the class code determined in step S6. In step S8, the region extracting unit 158 extracts a predictive tap from the supplied composite video signal. In step S9, the predictive computing unit 159 generates a component Y signal based on the predictive coefficient determined in step S7 and the predictive tap extracted in step S8, so that the process of extracting a Y signal is completed.

In this way, the classification adaptive processing circuit 102 extracts the component Y signal from the composite signal.

Likewise, other component signals including R-Y signal and B-Y signal can be extracted by performing the same process as that of extracting the Y signal, and thus the corresponding description will be omitted. In that case, the classification adaptive processing circuit 102 determines a predictive coefficient corresponding to each component signal in step S7.

As described above, the classification adaptive processing circuit 102 directly converts the composite signal to various types of component signals. Accordingly, more precise class can be easily selected.

Next, a "learning" method for preparing predictive coefficients to be stored in the coefficient memory 157 shown in FIG. 4 will be described. A predictive coefficient of each class corresponding to each of the methods of the pattern detecting units 152 to 154 is registered in the coefficient memory 157 by the manufacturer of the television receiver 100.

Figure 6:
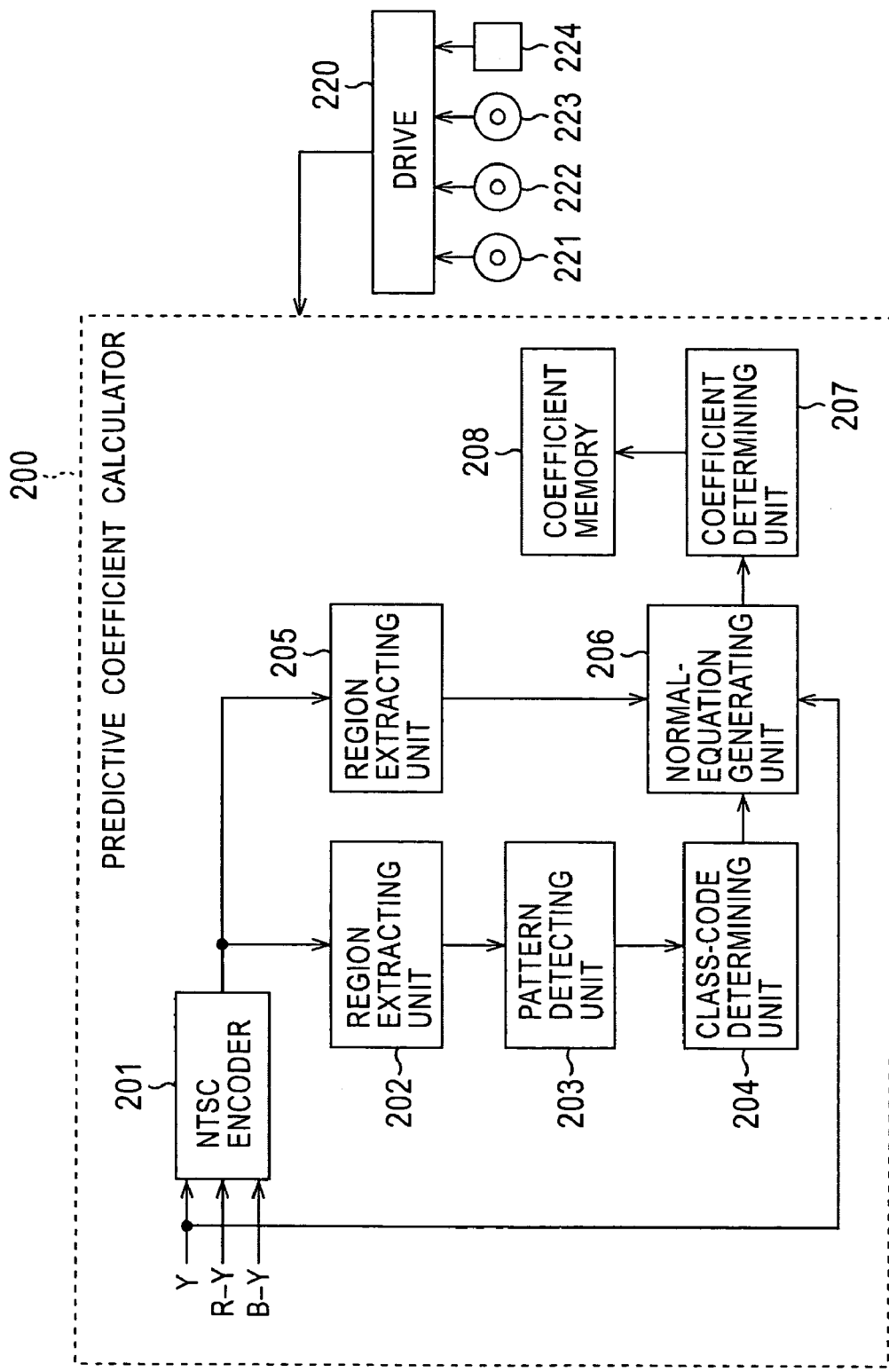
FIG. 6 is a block diagram showing an example of the configuration of a predictive coefficient calculator according to the present invention.

FIG. 6 shows an example of the configuration of a predictive coefficient calculator, which calculates (learns) predictive coefficients to be stored in the coefficient memory 157.

In FIG. 6, an NTSC encoder 201 of the predictive coefficient calculator 200 obtains a Y signal, R-Y signal, and B-Y signal, which are predetermined component signals corresponding to sample video input through an input terminal (not shown), generates an NTSC composite signal based on those component signals, and supplies the NTSC composite signal to region extracting units 202 and 205.

The region extracting unit 202 extracts a class tap, which is a pixel required for performing classification, from the supplied composite signal, and supplies the class tap to a pattern detecting unit 203.

The pattern detecting unit 203 detects the pattern of the composite video signal from the input class tap by using a predetermined method, and supplies the result to a class-code determining unit 204. The class-code determining unit 204 determines classes based on the supplied pattern and supplies corresponding class codes to a normal-equation generating unit 206.

Also, the region extracting unit 205 extracts a predictive tap, which is a pixel required for predicting and generating a component signal, from the supplied composite signal, and supplies the predictive tap to the normal-equation generating unit 206.

Further, the normal-equation generating unit 206 obtains a Y signal, which is a component signal input through an input terminal (not shown). Then, the normal-equation generating unit 206 generates a normal equation for each class code based on the obtained Y signal, the predictive tap supplied from the region extracting unit 205, and the class codes supplied from the class-code determining unit 204, so as to supply the normal equations to the coefficient determining unit 207.

When the number of the input normal equations is sufficient, the coefficient determining unit 207 solves the normal equations by using the method of least squares so as to obtain predictive coefficients, which are supplied to a coefficient memory 208 and are stored therein.

The pattern detecting unit 203 corresponds to, for example, the pattern detecting unit 152 of the classification adaptive processing circuit 102 of the television receiver 100 shown in FIG. 4, and detects a pattern by using the same method as in the pattern detecting unit 152. Accordingly, a predictive coefficient of each class set by the method of the pattern detecting unit 152 is stored in the coefficient memory 208.

Likewise, the pattern detecting unit 203 is allowed to correspond to the pattern detecting unit 153 or 154, so that predictive coefficients corresponding to the pattern detecting unit 153 or 154 can be obtained.

That is, the pattern detecting unit 203 of the predictive coefficient calculator 200 shown in FIG. 6 is allowed to correspond to each of the pattern detecting units 152 to 154 shown in FIG. 4 so as to calculate predictive coefficients, which are stored in the coefficient memory 208. Therefore, the number of predictive coefficients stored in the coefficient memory 208 is the same as the number of classes set by the pattern detecting units in the classification adaptive processing circuit 102 shown in FIG. 4.

The predictive coefficients stored in the coefficient memory 208 are supplied to the coefficient memory 157 shown in FIG. 4 and are stored therein.

Alternatively, when the normal-equation generating unit 206 obtains an R-Y signal, predictive coefficients for obtaining the R-Y signal can be obtained by using the above-described predictive coefficient calculator 200. Likewise, predictive coefficients for generating a B-Y signal can be obtained in the same way.

Further, the predictive coefficient calculator 200 includes a control unit (not shown), which controls the entire predictive coefficient calculator 200. Also, a drive 220 is connected to the predictive coefficient calculator 200 as required, and a magnetic disk 221, an optical disk 222, a magneto-optical disk 223, or a semiconductor memory 224 is loaded into the drive 220. A computer program read from such a recording medium is installed into a storage unit (not shown) included in the control unit (not shown) in the predictive coefficient calculator 200.

Figure 7:
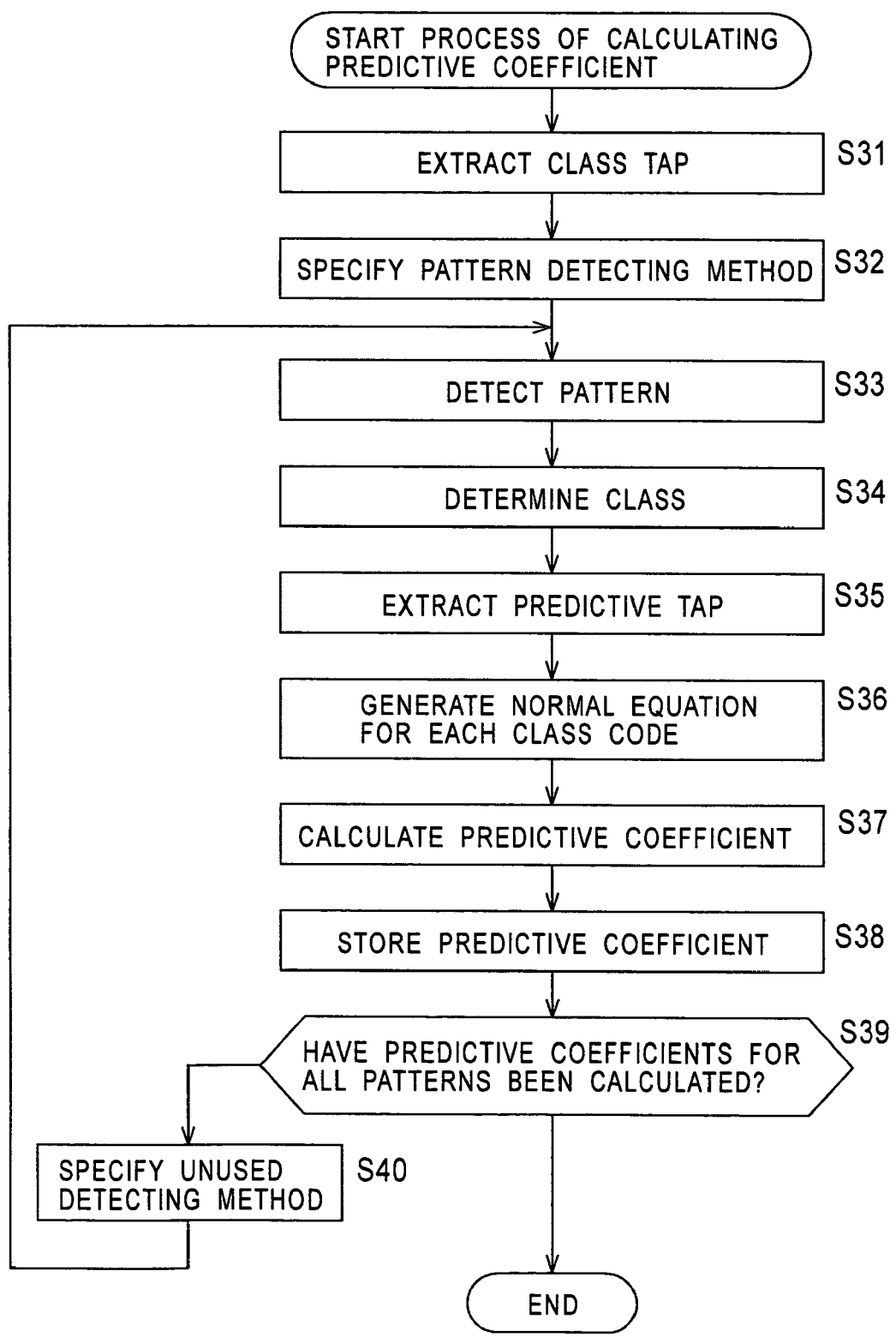
FIG. 7 is a flowchart illustrating a process of calculating a predictive coefficient, performed by the predictive coefficient calculator shown in FIG. 6.

Next, a process of calculating predictive coefficients performed by the predictive coefficient calculator 200 will be described with reference to the flowchart shown in FIG. 7.

First, in step S31, the region extracting unit 202 of the predictive coefficient calculator 200 extracts a class tap from the composite signal, which has been obtained by encoding component signals by the NTSC encoder 201. Then, in step S32, the predictive coefficient calculator 200 specifies a pattern detecting method (selects one of a plurality of pattern detecting units). In step S33, the selected pattern detecting unit 203 detects a pattern based on the class tap extracted by the region extracting unit 202. Then, in step S34, the class-code determining unit 204 determines classes based on the pattern detected by the pattern detecting unit 203.

In step S35, the region extracting unit 205 extracts a predictive tap from the composite signal generated by the NTSC encoder 201.

Then, the process proceeds to step S36, where the normal-equation generating unit 206 generates a normal equation for each class code determined by the class-code determining unit 204, by regarding the predictive tap extracted by the region extracting unit 205 as student data and regarding the component signal as teacher data. In step S37, the coefficient determining unit 207 solves the normal equations generated by the normal-equation generating unit 206 by using the method of least squares so as to obtain predictive coefficients. Then, in step S38, the coefficient memory 208 stores the predictive coefficients calculated by the coefficient determining unit 207.

In step S39, the control unit determines whether or not predictive coefficients have been calculated for all patterns (based on all the plurality of pattern detecting units 203). When it is determined that an unused detecting method (pattern detecting unit 203) exists and that predictive coefficients have not been calculated for all the patterns, an unused detecting method (pattern detecting unit 203) is specified in step S40, and the process returns to step S33 so that the following steps are repeated.

That is, by repeating steps S33 to S40, predictive coefficients corresponding to all the pattern detecting units 203 prepared in the predictive coefficient calculator 200 can be calculated.

Then, when it is determined that predictive coefficients for all the patterns have been calculated in step S39, the control unit ends the process of calculating predictive coefficients.

As described above, by calculating predictive coefficients corresponding to the prepared pattern detecting units 203 by using the predictive coefficient calculator 200, the coefficient memory 157 shown in FIG. 4 can prepare predictive coefficients corresponding to a prepared new pattern detecting method. Accordingly, versatility and expandability of the classification adaptive processing circuit 102 can be increased.

Next, a method for generating an evaluation table stored in the evaluation table 156 shown in FIG. 4 will be described. Evaluation tables, which show the detecting methods of the pattern detecting units 152 to 154 and the correspondence between each class and the S/N ratio thereof used by the class-code determining unit 155, are registered in the evaluation table 156 by the manufacturer in advance.

Figure 8:
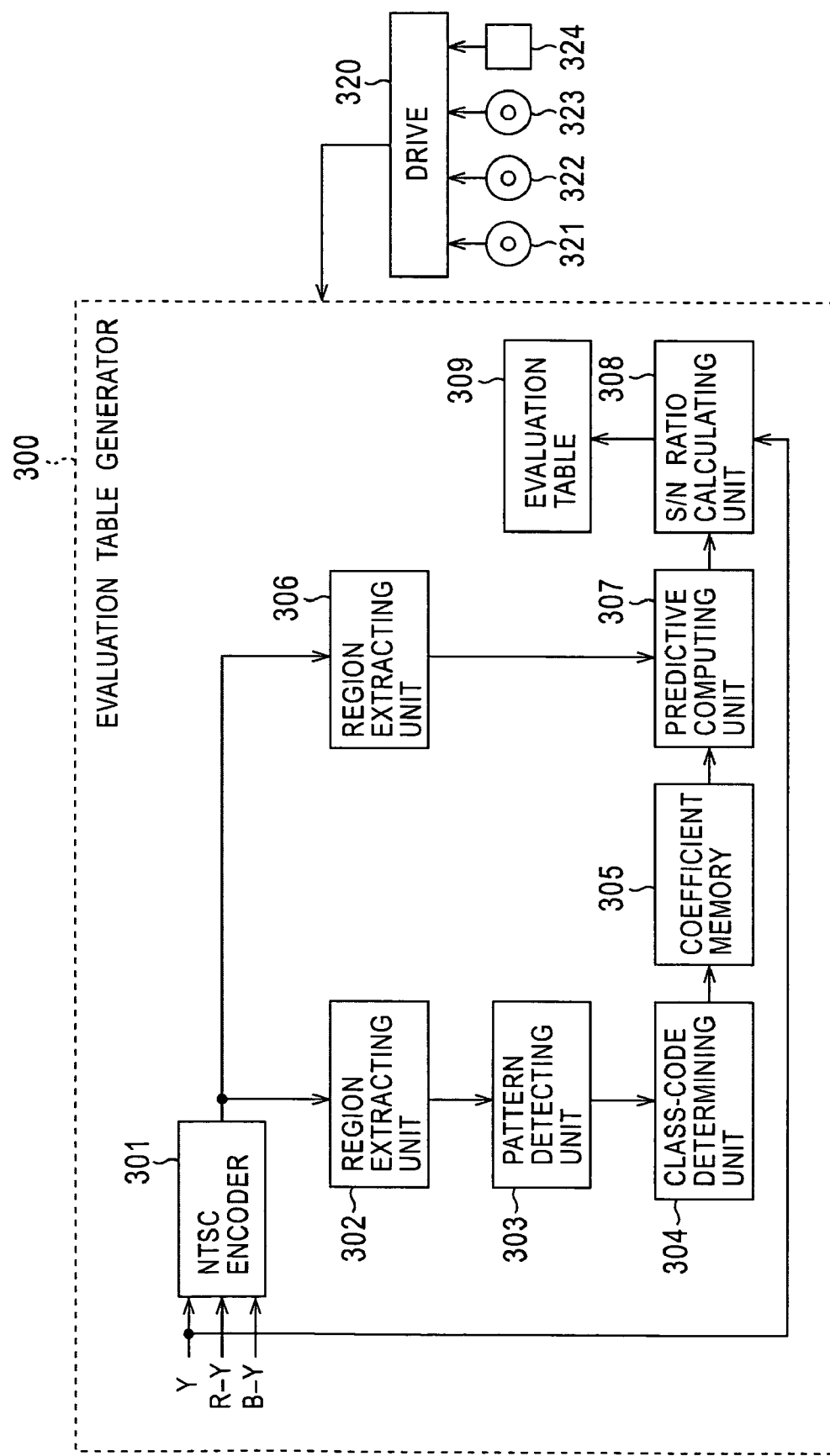
FIG. 8 is a block diagram showing an example of the configuration an evaluation table generator according to the present invention.

FIG. 8 shows an example of the configuration of an evaluation table generator for generating an evaluation table.

In FIG. 8, an NTSC encoder 301 of the evaluation table generator 300 obtains Y signal, R-Y signal, and B-Y signal, which are predetermined component signals corresponding to a sample video image, through an input terminal (not shown). Then, the NTSC encoder 301 performs encoding so as to generate an NTSC composite signal, and supplies the NTSC composite signal to region extracting units 302 and 306.

The region extracting unit 302 extracts a class tap, which is a pixel required for performing classification, from the composite signal supplied from the NTSC encoder 301, and supplies the class tap to a pattern detecting unit 303.

The pattern detecting unit 303 detects the pattern of the composite video signal based on the supplied class tap, and supplies the detection result to a class-code determining unit 304. The class-code determining unit 304 determines a class based on the pattern supplied from the pattern detecting unit 303, and supplies a class code corresponding to the class to a coefficient memory 305.

The coefficient memory 305 supplies a predictive coefficient corresponding to the obtained class code to a predictive computing unit 307. Also, the region extracting unit 306 obtains the composite signal, extracts a predictive tap, which is a pixel required for predictively generating a component signal, from the composite signal, and supplies the predictive tap to the predictive computing unit 307.

The predictive computing unit 307 performs predictive computing based on the predictive tap supplied from the region extracting unit 306 and the predictive coefficient supplied from the coefficient memory 305 so as to generate a Y signal, which is a component signal, and supplies the Y signal to an S/N ratio calculating unit 308.

The S/N ratio calculating unit 308 obtains a Y signal, which is a component signal input to the NTSC encoder 301, calculates S/N ratio based on the Y signal and the Y signal which has been supplied from the predictive computing unit 307, and supplies the calculated S/N ratio to the evaluation table 309. The evaluation table 309 generates an evaluation table based on the S/N ratio supplied from the S/N ratio calculating unit 308.

The evaluation table stored in the evaluation table 309 is supplied to the evaluation table 156 shown in FIG. 4 and is stored therein.

The pattern detecting unit 303 corresponds to, for example, the pattern detecting unit 152 of the classification adaptive processing circuit 102 of the television receiver 100 shown in FIG. 4, and detects a pattern by using the same method as in the pattern detecting unit 152. Accordingly, an evaluation table showing the correspondence between each class set by the method of the pattern detecting unit 152 and the S/N ratio of each class is stored in the evaluation table 309. Likewise, the pattern detecting unit 203 may be allowed to correspond to the pattern detecting unit 153 or 154, so that an evaluation table corresponding to the pattern detecting unit 153 or 154 can be obtained.

That is, the pattern detecting unit 303 of the evaluation table generator 300 shown in FIG. 8 is allowed to correspond to each of the pattern detecting units 152 to 154 shown in FIG. 4 so as to calculate S/N ratios, which are stored in the evaluation table 309. Accordingly, correspondences between classes and S/N ratios (evaluation tables), whose number is the same as the number of classes set by the pattern detecting units 152 to 154 in the classification adaptive processing circuit 102 shown in FIG. 4, are stored in the evaluation table 309.

Also, for example, when the S/N ratio calculating unit 308 obtains an R-Y signal, an evaluation table for generating the R-Y signal can be obtained by using the above-described evaluation table generator 300. Likewise, an evaluation table for generating a B-Y signal can be obtained in the same way.

Further, the evaluation table generator 300 includes a control unit (not shown), which controls the entire evaluation table generator 300. Also, a drive 320 is connected to the evaluation table generator 300 as required, and a magnetic disk 321, an optical disk 322, a magneto-optical disk 323, or a semiconductor memory 324 is loaded into the drive 320. A computer program read from such a recording medium is installed into a storage unit (not shown) included in the control unit (not shown) in the evaluation table generator 300.

Figure 9:
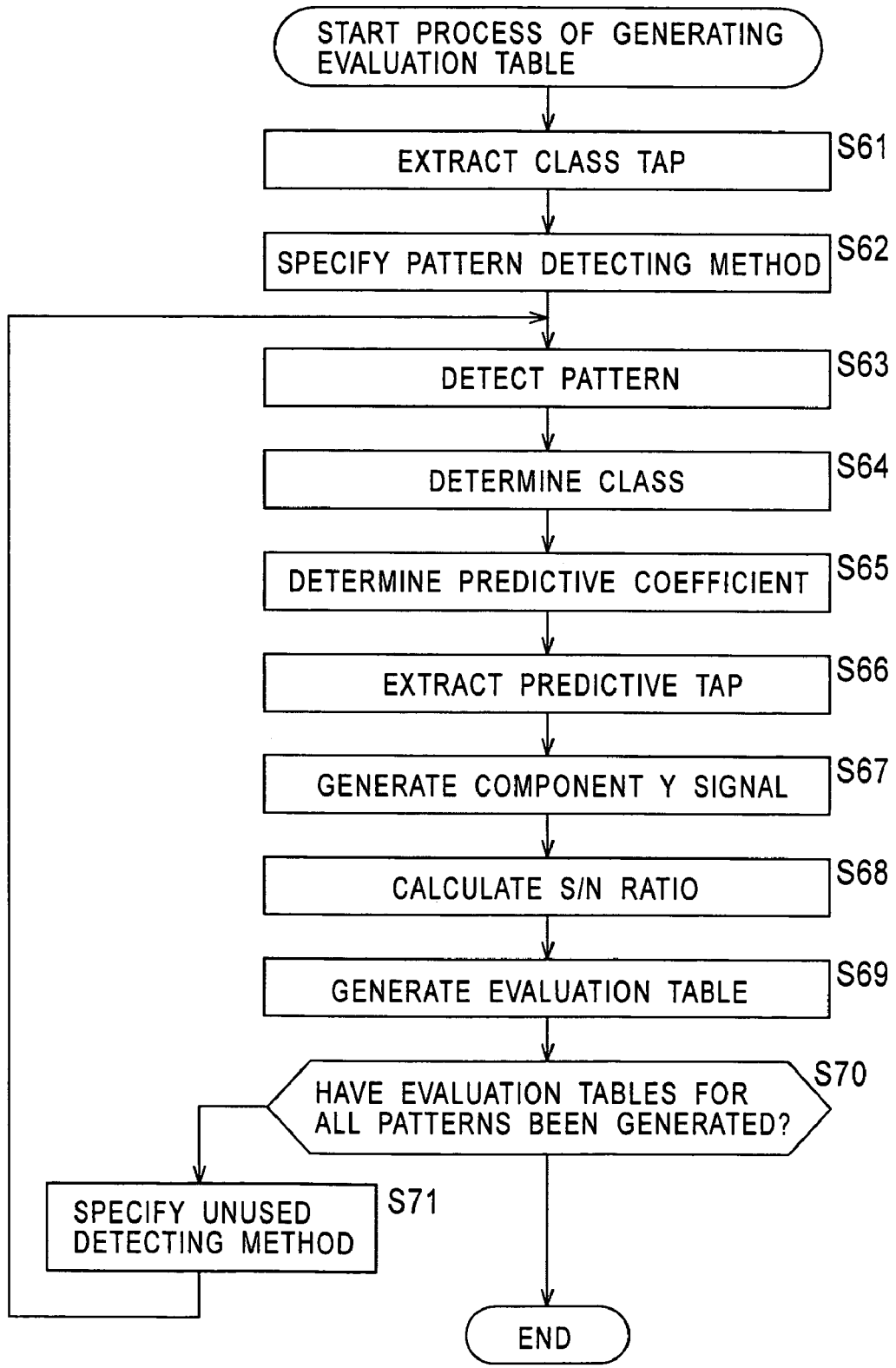
FIG. 9 is a flowchart illustrating a process of generating an evaluation table, performed by the evaluation table generator shown in FIG. 8.

Next, a process of generating an evaluation table performed by the evaluation table generator 300 is described with reference to the flowchart shown in FIG. 9.

First, in step S61, the region extracting unit 202 of the evaluation table generator 300 extracts a class trap from the composite signal, which has been generated by encoding the component signals by the NTSC encoder 301. Then, in step S62, the control unit specifies a pattern detecting method (select one of the pattern detecting units 303).

In step S63, the selected pattern detecting unit 303 detects a pattern from the extracted class tap. In step S64, the class-code determining unit 304 determines the class of the pattern detected by the region extracting unit 302. In step S65, the coefficient memory 305 determines a predictive coefficient corresponding to the class code of the class.

Also, the region extracting unit 306 extracts a predictive tap from the composite signal, which has been generated by encoding component signals by the NTSC encoder 301. Then, in step S67, the predictive computing unit 307 generates a Y signal, which is a component signal, based on the predictive tap extracted by the region extracting unit 306 and the predictive coefficient read from the coefficient memory 305.

In step S68, the S/N ratio calculating unit 308 calculates S/N ratio based on a Y signal before encoding (signal to be input to the NTSC encoder 301) and on the Y signal generated by the predictive computing unit 307 in step S67. Then, the process proceeds to step S69, where the evaluation table 309 generates an evaluation table by using the calculated S/N ratio.

In step S70, the control unit determines whether or not evaluation tables for all patterns (all the plurality of pattern detecting units 303) haven been generated. When it is determined that an unused detecting method (pattern detecting unit 303) exists and that evaluation tables for all the patterns have not been generated, the control unit specifies an unused detecting method (pattern detecting unit 303) in step S71. Then, the process returns to step S63, so that the following steps are repeated.

That is, by repeating steps S63 to S71, evaluation tables for all the patterns prepared in the classification adaptive processing circuit 102 are generated.

Then, when it is determined that evaluation tables have been generated for all the patterns in step S70, the control unit ends the process of generating an evaluation table.

As described above, by generating evaluation tables corresponding to the prepared pattern detecting units 303 by using the evaluation table generator 300, the evaluation table 156 shown in FIG. 4 can prepare an evaluation table corresponding to a prepared new pattern detecting method, and thus versatility and expandability of the classification adaptive processing circuit 102 can be increased.

That is, the classification adaptive processing circuit 102 shown in FIG. 4 can prepare various classification methods by using the predictive coefficient calculator 200 and the evaluation table generator 300, and thus classification can be performed by combining various methods. Next, combination of a plurality of classification methods prepared in the classification adaptive processing circuit 102 shown in FIG. 4 will be described.

Figure 10:
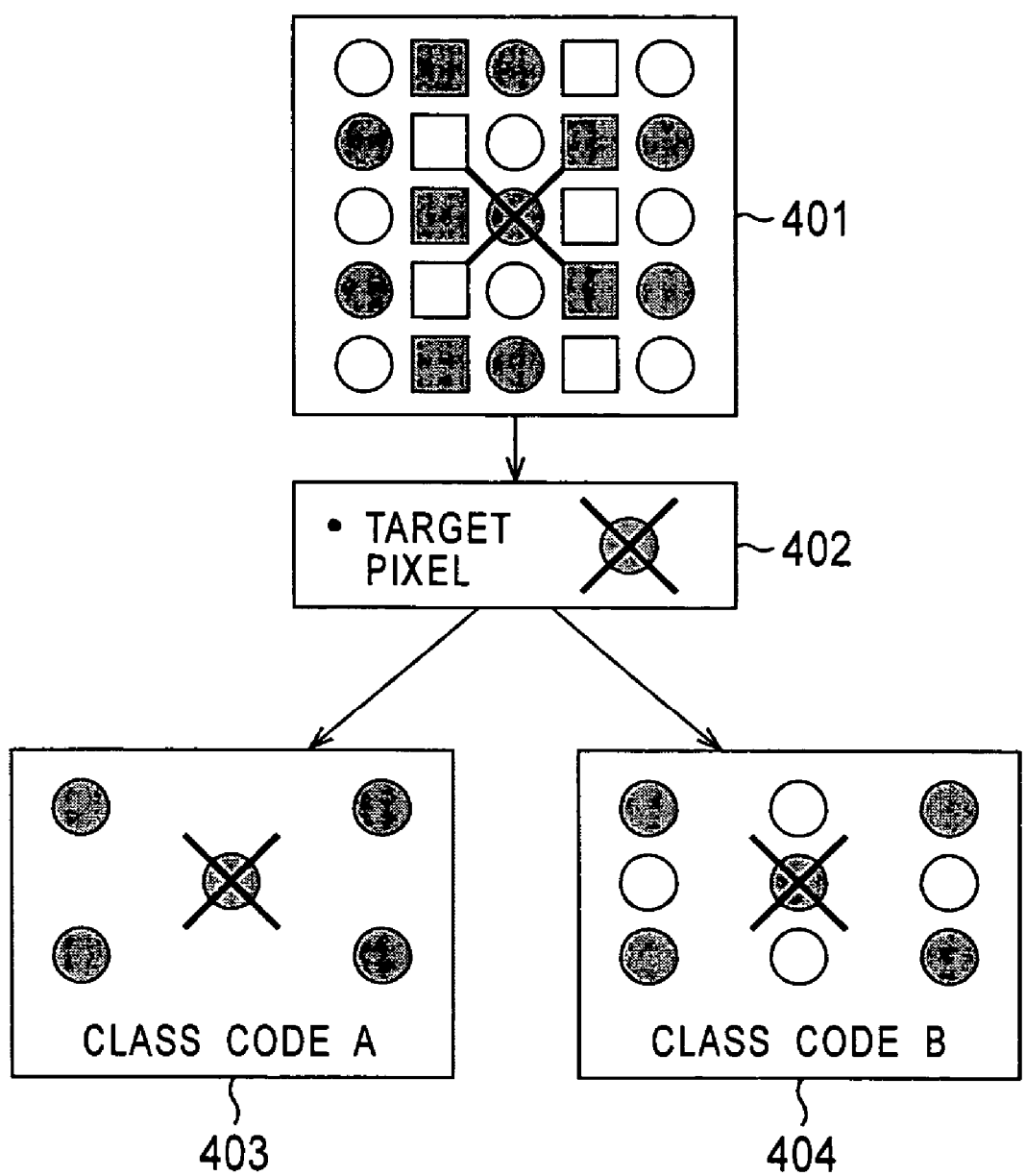
FIG. 10 shows an example of a state where patterns are detected from a composite signal so as to determine class codes.
Figure 11:
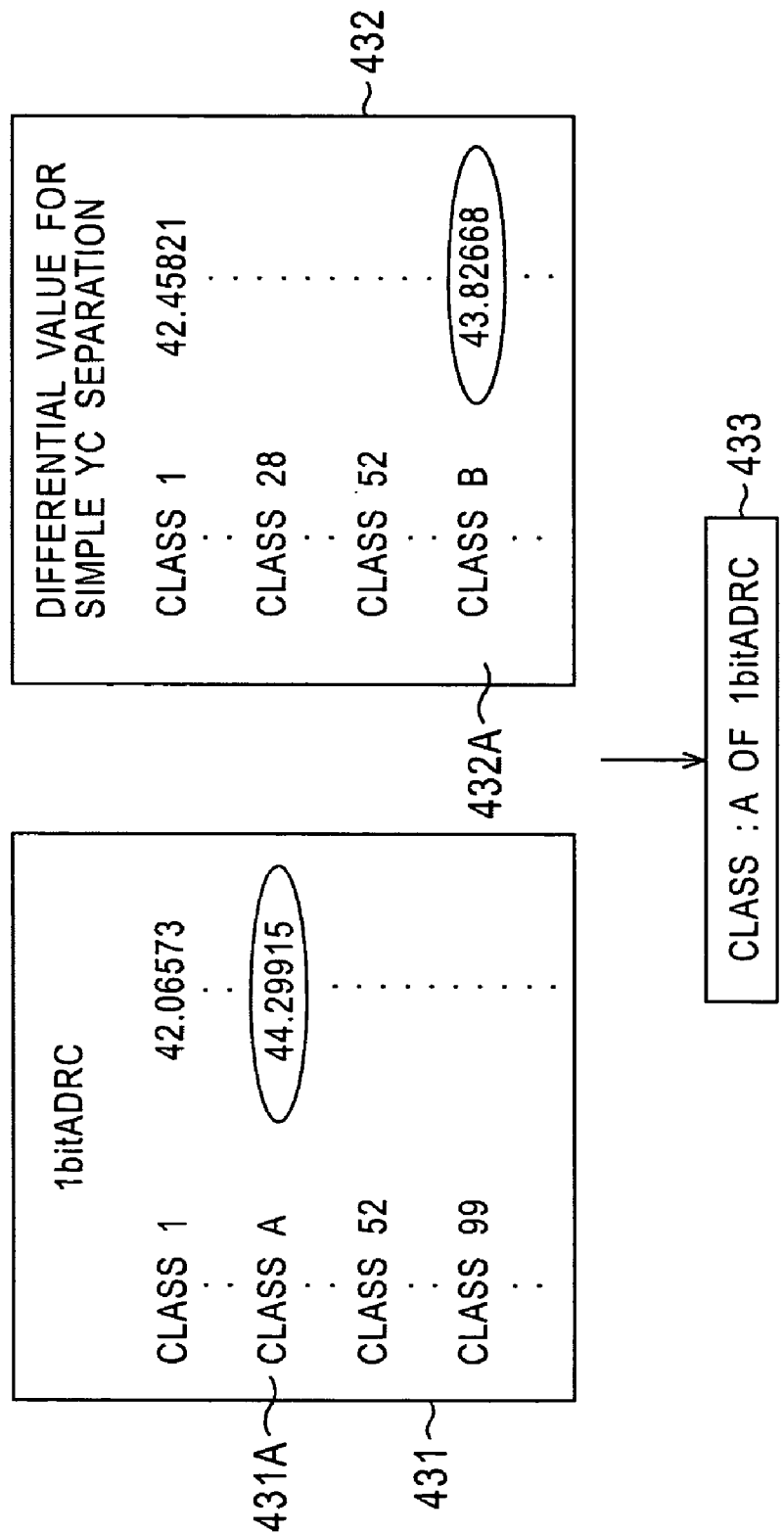
FIG. 11 shows an example of a state where a class code to be adopted is selected based on evaluation tables.

FIGS. 10 and 11 show a state where the classification adaptive processing circuit 102 detects the pattern of a composite signal so as to determine a class code to be adapted.

The region extracting unit 151 extracts a class tap 402 including a target pixel from a video image 401 corresponding to a composite signal input to the classification adaptive processing circuit 102.

Herein, as a classification method used by a pattern detecting unit prepared in the classification adaptive processing circuit 102, a combination of classification by in-face 1-bit ADRC (adaptive dynamic range coding) and classification by determining a differential value for simple YC separation by using threshold is prepared.

Then, each of two pattern detecting units prepared in the classification adaptive processing circuit 102 detects a pattern based on the class tap 402, so that a class code A (403) by in-phase 1-bit ADRC and a class code B (404) of determining the differential value for simple YC separation by using threshold are supplied to the class-code determining unit 155.

At this time, two evaluation tables shown in FIG. 11 are supplied from the evaluation table 156 to the class-code determining unit 155. One of the evaluation tables is an evaluation table 431 corresponding to classification by in-phase 1-bit ADRC and the other is an evaluation table 432 corresponding to classification by the differential value for simple YC separation.

Then, the class-code determining unit 155 obtains the S/N ratio values corresponding to the class code A (403) and the class code B (404) shown in FIG. 10, which have been supplied from the pattern detecting units, from the evaluation tables 431 and 432, and compares the S/N ratio values. Then, the class-code determining unit 155 supplies the class code having a larger S/N ratio to the coefficient memory 157.

In the example shown in FIGS. 10 and 11, an S/N ratio 431A corresponding to the class code A (403) is 44.29915, and an S/N ratio 432A corresponding to the class code A (404) is 43.82668. Therefore, the class A of in-phase 1-bit ADRC is regarded as a selected class 433, and the corresponding class code A (403) is supplied to the coefficient memory 157.

Figure 12:
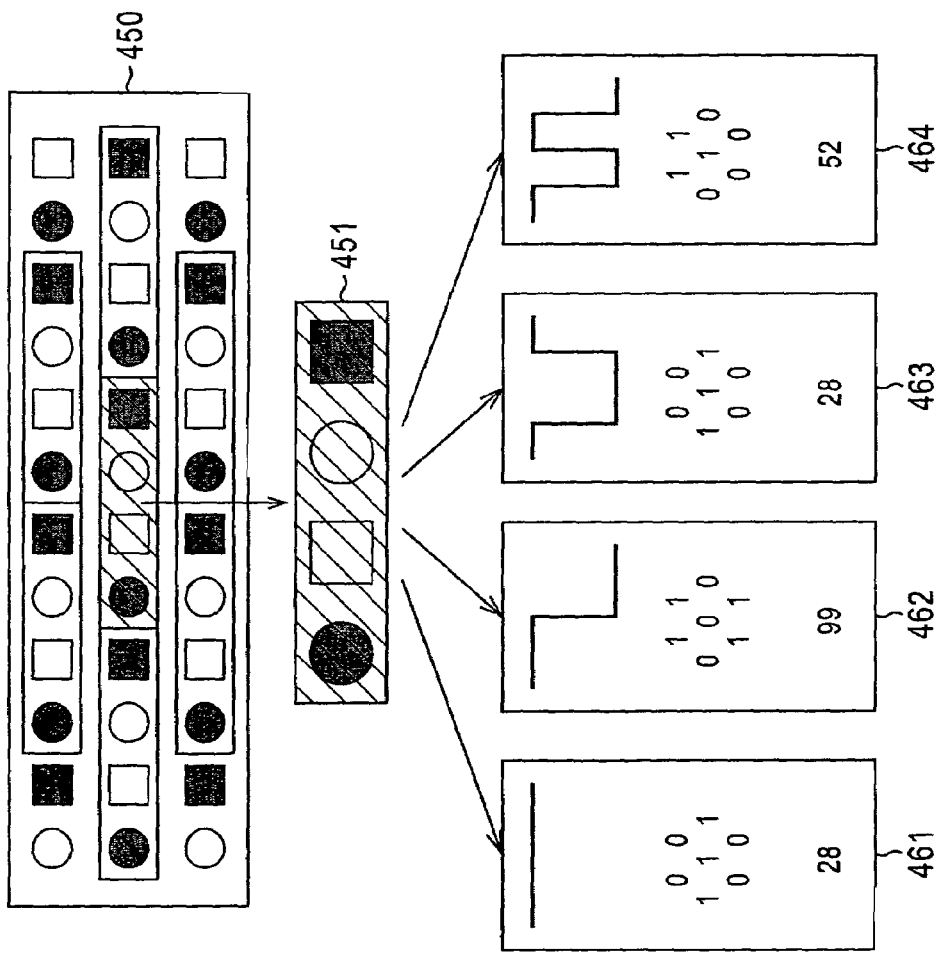
FIG. 12 shows another example of the state where patterns are detected from a composite signal so as to determine class codes.
Figure 13:
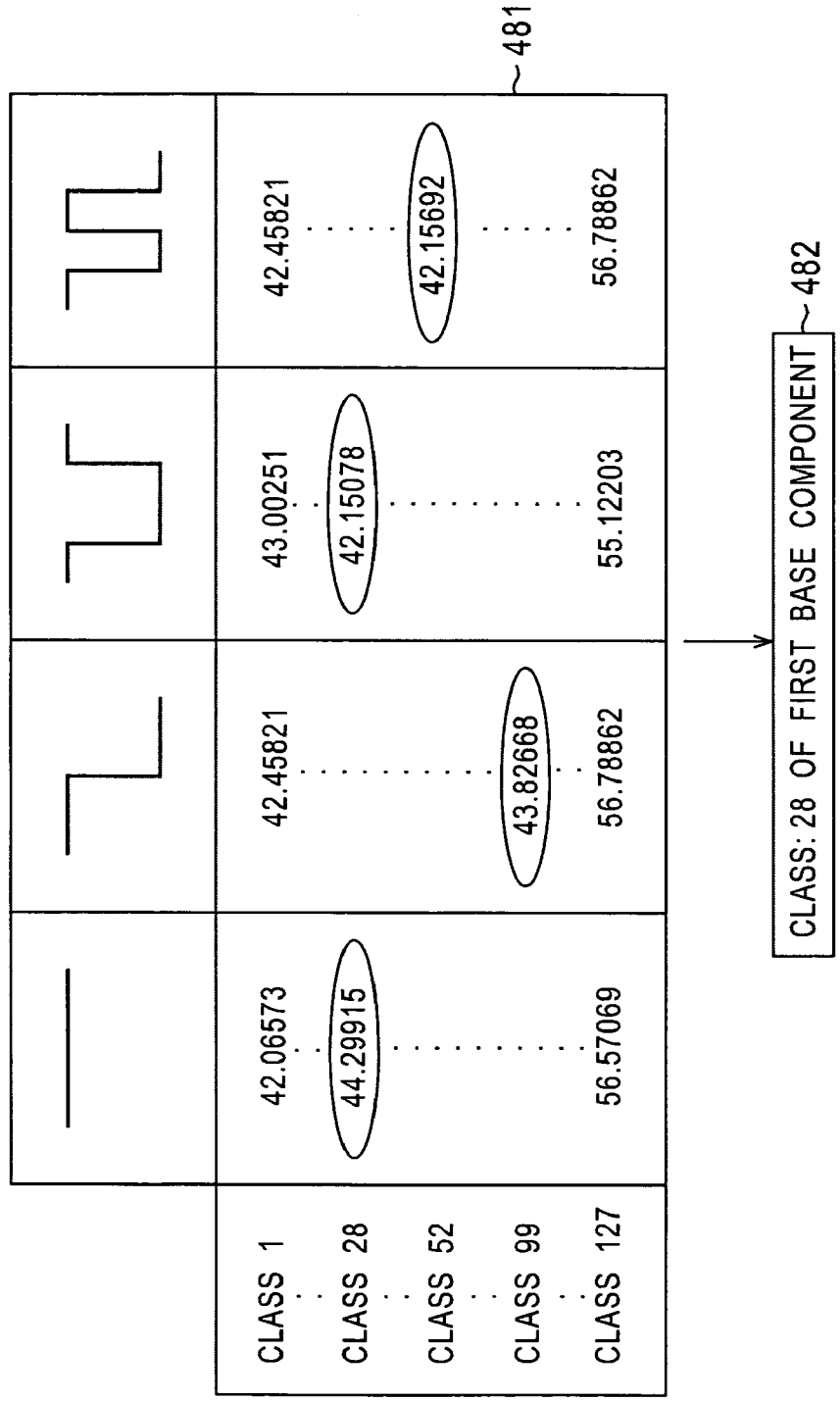
FIG. 13 shows another example of the state where a class code to be adopted is selected based on evaluation tables.

FIGS. 12 and 13 show another example of a state where the classification adaptive processing circuit 102 detects a pattern of a composite signal so as to determine a class code to be adopted.

In FIG. 12, the region extracting unit 151 of the classification adaptive processing circuit 102 extracts a class tap from a composite signal. Then, a pattern detecting unit transforms a pixel 450 corresponding to the extracted class tap to a target block 451 in units of 1×4 blocks by Hadamard transform, and performs 1-bit ADRC to each base component.

Then, the pattern detecting unit inputs 1-bit ADRC codes 461 to 464 of obtained base components to the class-code determining unit 155. The class-code determining unit 155 determines a class code 482 to be adopted from among the class codes 461 to 464 based on an evaluation table 481 shown in FIG. 13, which has been calculated in advance.

In the example shown in FIGS. 12 to 13, in the evaluation table 481, the S/N ratio corresponding to the class code 461 is 44.29915, the S/N ratio corresponding to the class code 462 is 43.82668, the S/N ratio corresponding to the class code 463 is 42.15078, and the S/N ratio corresponding to the class code 464 is 42.15692. Accordingly, a first base class 28 corresponding to the class code 461 is determined to be the class code 482 to be adopted.

In this way, the classification adoptive processing circuit 102 individually learns a plurality of classification methods, calculates coefficients and S/N ratio of each class in advance, obtains a class code by applying a plurality of classification methods to the next input, and selects the classification method of the largest S/N ratio based on the calculated S/N ratios.

Accordingly, when classification is preformed by simply combining a classification method A for classifying into 128 classes and a classification method B for classifying into 128 classes, class codes of 128×128 classes, that is, 16384 classes, and corresponding predictive coefficients must be prepared.

On the other hand, when the classification adaptive processing circuit shown in FIG. 4 is used, class codes for 128+128 classes, that is, 256 classes, and corresponding predictive coefficients may be prepared. Accordingly, the amount of data to be prepared can be significantly reduced, and a class for performing mapping statistically most precisely can be selected.

Figure 14:
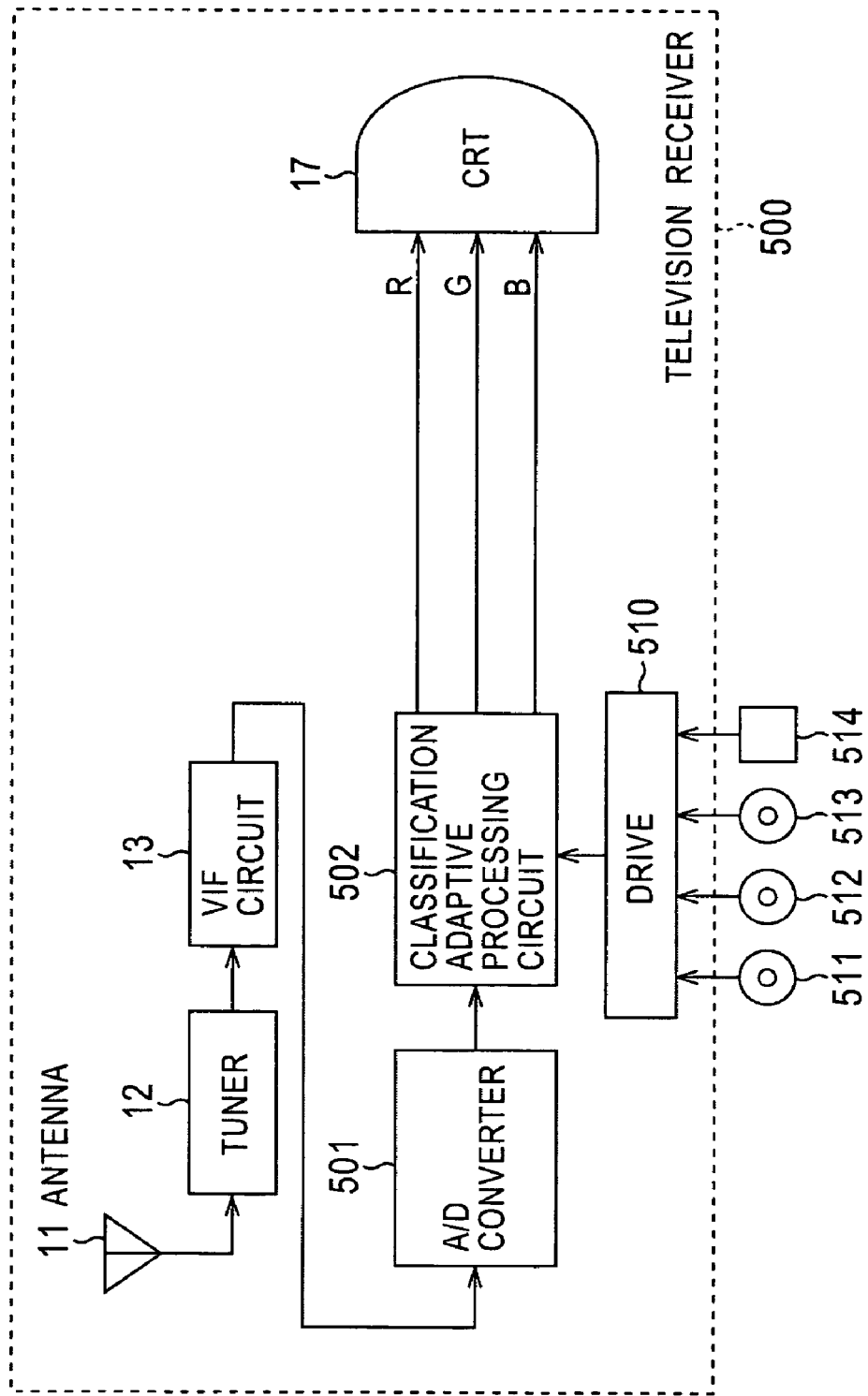
FIG. 14 is another example of the configuration of the television receiver according to the present invention.

In the above description, the classification adaptive processing circuit 102 shown in FIG. 2 converts a composite video signal to a Y signal, which is a luminance signal, and an R-Y signal and B-Y signal, which are color-difference signals. Alternatively, as shown in FIG. 14, the composite video signal may be directly converted to three primary-color signals: R signal, G signal, and B signal.

In FIG. 14, a classification adaptive processing circuit 502 of a television receiver 500 directly converts a digital composite video signal supplied from an A/D converter 501 to R signal, G signal, and B signal, which are component signals, and supplies these signals to a CRT 17. Classification by the classification adaptive processing circuit 502 is performed in the same manner as in the classification adaptive processing circuit 102 shown in FIG. 2.

In the television receiver 500 shown in FIG. 14, the function of the signal processing unit 19 including the Y/C separator 14, the chroma decoder 15, and the matrix circuit 16 of the television receiver 1 shown in FIG. 1 is realized by using the A/D converter 501 and the classification adaptive processing circuit 502. The configuration of the other part of the television receiver 500 is the same as that shown in FIG. 1.

Further, a drive 510 is connected to the classification adaptive processing circuit 502 as required, and a magnetic disk 511, an optical disk 512, a magneto-optical disk 513, or a semiconductor memory 514 is loaded into the drive 510. A computer program read from such a recording medium is installed into a storage unit (not shown) included in the classification adaptive processing circuit 502 as required.

The classification adaptive processing circuit of the television receiver, which converts a composite video signal to a component signal, has been described above. Alternatively, the above-described classification adaptive processing circuit can be applied to a standard definition-high definition (SD-HD) converting circuit in a high-definition television receiver or to a signal processing circuit for removing distortion in image information compressed by a moving picture experts group (MPEG) method. Further, other types of signal processing circuits may also be applied.

The above-described processes may be performed by hardware or software. When the series of processes are performed by software, a program constituting the software is installed into a computer incorporated into a dedicated hardware or into a multi-purpose personal computer which can executed various functions by installing various programs thereto, through a network or a recording medium.

The recording medium includes package media which are distributed for providing a program to users and which contain a program, such as the magnetic disk 111, 221, 321, or 511 (including a floppy disk), the optical disk 112, 222, 322, or 512 (including a compact disk-read only memory (CD-ROM) and a digital versatile disk (DVD)), the magneto-optical disk 113, 223, 323, or 513 (including a mini-disk (MD)), and the semiconductor memory 114, 224, 324, or 514, as shown in FIGS. 2, 6, 8, and 14. Also, the recording medium includes the ROM incorporated into the classification adaptive processing circuit 102 or 502, the predictive coefficient calculator 200, or the evaluation table generator 300, the ROM being incorporated into the main body of the device and containing a program.

In the description, steps describing a program recorded in the recording medium may be performed in time-series according to the described order, or may be performed in parallel or individually.

INDUSTRIAL APPLICABILITY

As described above, according to the signal processing apparatus and method, recording medium, and program of the present invention, more preferable class can be easily selected.

The invention claimed is:

1. A signal processing apparatus comprising:
   first extracting means for extracting a first part used for classification from an input signal to which a plurality of types of signals are multiplexed;
   detecting/classifying means for detecting patterns by using a plurality of methods based on the first part extracted by the first extracting means so as to classify the patterns into classes;
   first storage means for storing an S/N-ratio value of each of the classes set by the detecting/classifying means;
   class determining means for determining a class to be adopted from the classes set by the first detecting/classifying means based on the S/N-ratio values stored in the first storage means;
   second storage means for storing a plurality of predictive coefficients;
   predictive-coefficient determining means for determining a predictive coefficient corresponding to the class determined by the class determining means from the predictive coefficients stored in the second storage means;
   second extracting means for extracting a second part used for prediction from the input signal; and
   signal generating means for computing and generating a predetermined signal based on the second part extracted by the second extracting means and the predictive coefficient determined by the predictive-coefficient determining means.

2. The signal processing apparatus according to claim 1, wherein the first storage means stores the S/N-ratio values, which correspond to each of the methods used by the detecting/classifying means.

3. The signal processing apparatus according to claim 1, wherein the first storage means stores the S/N-ratio values, each value corresponding to one of the classes set by the detecting/classifying means.

4. The signal processing apparatus according to claim 1, wherein the second storage means stores the predictive coefficients, which correspond to each of the methods used by the detecting/classifying means.

5. The signal processing apparatus according to claim 1, wherein the second storage means stores the predictive coefficients, each coefficient corresponding to one of the classes set by the detecting/classifying means.

6. The signal processing apparatus according to claim 1, wherein the first storage means stores S/N-ratio values supplied from another signal processing apparatus.

7. The signal processing apparatus according to claim 1, wherein the second storage means stores predictive coefficients supplied from another signal processing apparatus.

8. A signal processing method comprising:
a first extracting step of extracting a first part used for classification from an input signal to which a plurality of types of signals are multiplexed;
a detecting/classifying step of detecting patterns by using a plurality of methods based on the first part extracted in the first extracting step so as to classify the patterns into classes;
a first storage control step of controlling storage of an S/N-ratio value of each of the classes set in the detecting/classifying step;
a class determining step of determining a class to be adopted from the classes set in the first detecting/classifying step based on the S/N-ratio values, the storage thereof being controlled in the first storage control step;
a second storage control step of controlling storage of a plurality of predictive coefficients;
a predictive-coefficient determining step of determining a predictive coefficient corresponding to the class determined in the class determining step from the predictive coefficients, the storage thereof being controlled in the second storage control step;
a second extracting step of extracting a second part used for prediction from the input signal; and
a signal generating step of computing and generating a predetermined signal based on the second part extracted in the second extracting step and the predictive coefficient determined in the predictive-coefficient determining step.

9. A computer-readable medium encoded with a computer-readable program that when executed on a processor causes the processor to execute a signal processing method, said method comprising:
a first extracting step of extracting a first part used for classification from an input signal to which a plurality of types of signals are multiplexed;
a detecting/classifying step of detecting patterns by using a plurality of methods based on the first part extracted in the first extracting step so as to classify the patterns into classes;
a first storage control step of controlling storage of an S/N-ratio value of each of the classes set in the detecting/classifying step;
a class determining step of determining a class to be adopted from the classes set in the first detecting/classifying step based on the S/N-ratio values, the storage thereof being controlled in the first storage control step;
a second storage control step of controlling storage of a plurality of predictive coefficients;
a predictive-coefficient determining step of determining a predictive coefficient corresponding to the class determined in the class determining step from the predictive coefficients, the storage thereof being controlled in the second storage control step;
a second extracting step of extracting a second part used for prediction from the input signal; and
a signal generating step of computing and generating a predetermined signal based on the second part extracted in the second extracting step and the predictive coefficient determined in the predictive-coefficient determining step.

10. A signal processing apparatus comprising:
multiplexing means for multiplexing a plurality of signals, each signal including one type of signal;
first extracting means for extracting a first part used for classification from a signal generated by multiplexing the plurality of signals by using the multiplexing means;
detecting/classifying means for detecting patterns by using predetermined methods based on the first part extracted by the first extracting means so as to classify the patterns into classes;
first storage means for storing a plurality of predictive coefficients;
predictive-coefficient determining means for determining a predictive coefficient corresponding to the class set by the detecting/classifying means from the predictive coefficients stored in the first storage means;
second extracting means for extracting a second part used for prediction from the multiplexed signal;
signal generating means for computing and generating a predetermined signal based on the second part extracted by the second extracting means and the predictive coefficient determined by the predictive-coefficient determining means;
S/N-ratio calculating means for calculating S/N-ratio values used for generating the predetermined signal by the signal generating means; and
second storage means for storing the S/N-ratio values calculated by the S/N-ratio calculating means.

11. The signal processing apparatus according to claim 10, wherein the first storage means stores the predictive coefficients, which correspond to each of the methods used by the detecting/classifying means.

12. The signal processing apparatus according to claim 10, wherein the first storage means stores the predictive coefficients, each coefficient corresponding to one of the classes set by the detecting/classifying means.

13. The signal processing apparatus according to claim 10, wherein the second storage means stores the S/N-ratio values, which correspond to each of the methods used by the detecting/classifying means.

14. The signal processing apparatus according to claim 10, wherein the second storage means stores the S/N-ratio values, each value corresponding to one of the classes set by the detecting/classifying means.

15. The signal processing apparatus according to claim 10, further comprising supplying means for supplying the S/N-ratio values stored in the second storage means to another signal processing apparatus.

16. A signal processing method comprising:
a multiplexing step of multiplexing a plurality of signals, each signal including one type of signal;
a first extracting step of extracting a first part used for classification from a signal generated by multiplexing the plurality of signals in the multiplexing step;
a detecting/classifying step of detecting patterns by using predetermined methods based on the first part extracted in the first extracting step so as to classify the patterns into classes;
a first storage control step of controlling storage of a plurality of predictive coefficients;
a predictive-coefficient determining step of determining a predictive coefficient corresponding to the class set in the detecting/classifying step from the predictive coefficients, the storage thereof being controlled in the first storage control step;

a second extracting step of extracting a second part used for prediction from the multiplexed signal;

a signal generating step of computing and generating a predetermined signal based on the second part extracted in the second extracting step and the predictive coefficient determined in the predictive-coefficient determining step;

an S/N-ratio calculating step of calculating S/N-ratio values used for generating the predetermined signal in the signal generating step; and a second storage control step of controlling storage of the S/N-ratio values calculated in the S/N-ratio calculating step.

17. A computer-readable medium encoded with a computer-readable program that when executed on a processor causes the processor to execute a signal processing method, said method comprising:

a multiplexing step of multiplexing a plurality of signals, each signal including one type of signal;

a first extracting step of extracting a first part used for classification from a signal generated by multiplexing the plurality of signals in the multiplexing step;

a detecting/classifying step of detecting patterns by using predetermined methods based on the first part extracted in the first extracting step so as to classify the patterns into classes;

a first storage control step of controlling storage of a plurality of predictive coefficients;

a predictive-coefficient determining step of determining a predictive coefficient corresponding to the class set in the detecting/classifying step from the predictive coefficients, the storage thereof being controlled in the first storage control step;

a second extracting step of extracting a second part used for prediction from the multiplexed signal;

a signal generating step of computing and generating a predetermined signal based on the second part extracted in the second extracting step and the predictive coefficient determined in the predictive-coefficient determining step;

an S/N-ratio calculating step of calculating S/N-ratio values used for generating the predetermined signal in the signal generating step; and a second storage control step of controlling storage of the S/N-ratio values calculated in the S/N-ratio calculating step.

* * * * *